(12) United States Patent
Fukuda

(10) Patent No.: US 7,522,934 B2
(45) Date of Patent: Apr. 21, 2009

(54) APPARATUS, METHOD, RECORDING MEDIUM, AND PROGRAM FOR CONTROLLING POWER OF WIRELESS COMMUNICATION

(75) Inventor: Kunio Fukuda, Tokyo (JP)

(73) Assignee: Sony Corporation (JP)

( * ) Notice: Subject to any disclaimer, the term of this patent is extended or adjusted under 35 U.S.C. 154(b) by 162 days.

(21) Appl. No.: 10/549,591

(22) PCT Filed: Mar. 12, 2004

(86) PCT No.: PCT/JP2004/003325

§ 371 (c)(1),
(2), (4) Date: May 22, 2006

(87) PCT Pub. No.: WO2004/086683

PCT Pub. Date: Oct. 7, 2004

(65) Prior Publication Data

US 2007/0037600 A1 Feb. 15, 2007

(30) Foreign Application Priority Data

Mar. 26, 2003 (JP) ............................. 2003-084147

(51) Int. Cl.
*H04B 7/00* (2006.01)
(52) U.S. Cl. .................. 455/522; 455/127.5; 370/230; 370/338; 370/346; 370/445; 375/132
(58) Field of Classification Search ............... 455/522, 455/127.5; 370/447, 461
See application file for complete search history.

(56) References Cited

U.S. PATENT DOCUMENTS

| | | | |
|---|---|---|---|
| 5,592,468 A * | 1/1997 | Sato ........................... 370/252 |
| 5,661,434 A * | 8/1997 | Brozovich et al. ............ 330/51 |
| 5,732,077 A * | 3/1998 | Whitehead ................... 370/349 |
| 5,768,277 A * | 6/1998 | Ohno et al. .................. 370/457 |
| 5,802,105 A * | 9/1998 | Tiedemann et al. ......... 375/225 |
| 5,889,772 A * | 3/1999 | Fischer et al. ............... 370/346 |
| 6,215,987 B1 | 4/2001 | Fujita |
| 6,256,334 B1 * | 7/2001 | Adachi ....................... 375/132 |

(Continued)

FOREIGN PATENT DOCUMENTS

JP 04-287433 A 10/1992

(Continued)

*Primary Examiner*—Duc Nguyen
*Assistant Examiner*—Hai V Nguyen
(74) *Attorney, Agent, or Firm*—Lerner, David, Littenberg, Krumholz & Mentlik, LLP

(57) ABSTRACT

This invention relates to an information processing apparatus, an information processing method, a recording medium, and a program for transmitting an RTS frame at full power and data at low power. If it is ascertained that data is to be transmitted, an RTS frame is transmitted at full power. If a CTS frame enabling data transmission is not received, a determination is made as to whether a CTS frame is received with its RA field carrying the address of another terminal. If the latter CTS is found to have been received, a transmission-prohibited interval is set and counted based on a duration field in the CTS frame. If the CTS frame enabling data transmission is found to have been received, a reception level of the frame is measured and stored. Data is transmitted by a PDA at lower power. An ACK frame is received. This invention applies illustratively to PDAs.

14 Claims, 16 Drawing Sheets

U.S. PATENT DOCUMENTS

| | | | |
|---|---|---|---|
| 6,295,285 B1* | 9/2001 | Whitehead | 370/329 |
| 6,351,456 B1* | 2/2002 | Struhsaker et al. | 370/280 |
| 6,393,032 B1* | 5/2002 | Ikegami | 370/447 |
| 6,404,756 B1* | 6/2002 | Whitehill et al. | 370/338 |
| 7,023,817 B2* | 4/2006 | Kuffner et al. | 370/324 |
| 7,035,917 B2* | 4/2006 | Yamasita | 709/220 |
| 7,177,294 B2* | 2/2007 | Chen et al. | 370/338 |
| 7,215,681 B2* | 5/2007 | Li | 370/445 |
| 7,286,474 B2* | 10/2007 | Garg et al. | 370/230 |
| 2002/0077138 A1* | 6/2002 | Bark et al. | 455/522 |
| 2002/0083246 A1* | 6/2002 | Rupp et al. | 710/107 |
| 2002/0136183 A1* | 9/2002 | Chen et al. | 370/338 |
| 2002/0172186 A1* | 11/2002 | Larsson | 370/349 |
| 2002/0191567 A1* | 12/2002 | Famolari et al. | 370/335 |
| 2002/0193133 A1* | 12/2002 | Shibutani | 455/522 |
| 2003/0002680 A1* | 1/2003 | Akiyama et al. | 380/278 |
| 2003/0177379 A1* | 9/2003 | Hori et al. | 713/193 |
| 2004/0141468 A1* | 7/2004 | Christensen et al. | 370/252 |
| 2004/0152423 A1* | 8/2004 | Reznik | 455/67.11 |
| 2004/0179537 A1* | 9/2004 | Boyd et al. | 370/395.54 |
| 2004/0179588 A1* | 9/2004 | Kuffner et al. | 375/224 |
| 2004/0195311 A1* | 10/2004 | Silverbrook et al. | 235/375 |
| 2005/0063356 A1* | 3/2005 | Larsen et al. | 370/351 |
| 2005/0075124 A1* | 4/2005 | Willenegger et al. | 455/522 |
| 2007/0104171 A1* | 5/2007 | Kasami et al. | 370/339 |
| 2007/0121706 A1* | 5/2007 | Nakamura et al. | 375/141 |
| 2007/0282900 A1* | 12/2007 | Owens et al. | 707/104.1 |
| 2008/0076465 A1* | 3/2008 | Larsson | 455/522 |
| 2008/0076466 A1* | 3/2008 | Larsson | 455/522 |

FOREIGN PATENT DOCUMENTS

| | | |
|---|---|---|
| JP | 10-341172 A | 12/1998 |
| JP | 11-17687 A | 1/1999 |
| JP | 2002-217913 A | 8/2002 |

* cited by examiner

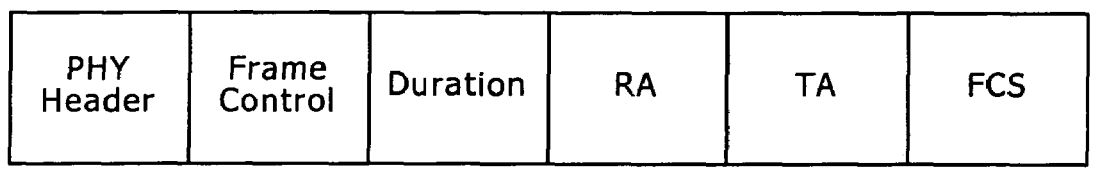
F I G . 9

APPARATUS, METHOD, RECORDING MEDIUM, AND PROGRAM FOR CONTROLLING POWER OF WIRELESS COMMUNICATION

CROSS-REFERENCE TO RELATED APPLICATIONS

The present application is a national stage application under 35 U.S.C. § 371 of International Application No. PCT/JP2004/003325, filed Mar. 12, 2004, which claims priority from Japanese Application No. P2003-084147, filed Mar. 26, 2003, the disclosures of which are hereby incorporated by reference herein.

BACKGROUND OF THE INVENTION

1. Technical Field

The present invention relates to an information processing apparatus, an information processing method, a recording medium, and a program. More particularly, the invention relates to an information processing apparatus, an information processing method, a recording medium, and a program for reducing the level of transmission power during wireless communication.

2. Background Art

The demand for wireless LANs (Local Area Networks) has grown appreciably in recent years. Wireless LANs are set up extensively today in the office, in households and at so-called hot spots, implemented typically in accordance with the IEEE 802.11b standard using the 2.4 GHz band or with the IEEE 802.11a using the 5 GHz band. The hot spot is a location furnished with a wireless LAN that allows users of information processing apparatuses with wireless communication capabilities (e.g., PDA (Personal Digital (Data) Assistants) or personal computers) on the move to access the Internet. Within about a 100-meter radius of a base station constituting a hot spot, a user carrying around a PDA or a personal computer may communicate wirelessly with the base station for high-speed access to the Internet wired to that base station.

The IEEE 802.11b standard stipulates the use of coding technology known as CCK (Complimentary Code Keying), adopts direct diffusion for the modulation system, and allows for data transmission speeds of up to 11 Mbps. The IEEE 802.11a standard adopts OFDM (Orthogonal Frequency Division Multiplex) for the modulation system and allows for data transmission speeds of up to 54 Mbps.

The basic access procedure according to IEEE 802.11 is called DCF (Distributed Coordination Function) used in what is known as the CSMA/CA scheme to provide autonomous distributed access control. In basic operations under the CSMA/CA scheme, a wireless station attempting to transmit signals verifies the use status of wireless channels in advance (called a carrier-sense operation) to avert interference with signal transmission by other wireless stations. The transmitting station transmits data immediately if there is an unused (i.e., idle) channel available, or postpones data transmission if all channels are being used (i.e., busy) until a channel becomes available. The receiving side returns an acknowledgement (ACK) for confirmation following receipt of the data. If acknowledgement is not returned, the transmitting side retransmits the data.

The IEEE 802.11 standard stipulates the specifications for physical layers of media as well as for MAC (Media Access Control) layers for establishing basic communications using the physical media (e.g., see Wireless LAN Medium Access Control (MAC) and Physical Layer (PHY) Specifications, ANSI/IEEE Std 802.11, 1999 Edition).

Where battery-powered small information processing apparatuses such as PDAs are used as wireless LAN terminals, it is particularly desirable that each apparatus minimize its power dissipation during wireless communication.

If the opposite party of wireless communication (e.g., base station) is sufficiently near, each terminal may lower its level of transmission power in proportion to the distance to the communicating party.

Reducing the level of transmission power is allowed if the communicating party is the base station and if no other terminal is located within the service area of that base station. If any other terminal does exist in the same service area, there can be interference with data transmission by that terminal.

A conventional wireless communication system is described below with reference to FIG. 1. Terminals 1 and 2 within a service area 11 of a base station 3 communicate wirelessly with that base station 3. The base station 3 is wired to the Internet 4. The terminals 1 and 2 can gain access to a server 5 on the Internet 4 via the base station 3.

The terminal 1 is allowed to enter power-down mode for power-saving data transmission in proportion to the distance to the base station 3. The terminal 2 is not designed to have power-down mode and always transmits data at full power to the base station 3. The terminal 1 in power-down mode can transmit data over a distance approximately the same as that between the terminal 1 and the base station 3, i.e., over a range 12 as indicated in FIG. 1. If any other terminal (e.g., terminal 2) is not located within the range 12, that terminal is incapable of successfully performing a carrier-sense operation on the data being transmitted by the terminal 1.

Suppose that during data transmission by the terminal 1 in power-down mode to the base station 3, the terminal 2 outside the range 12 carries out a carrier-sense operation preparatory to its own data transmission to the base station 3, as shown in FIG. 2. In that case, the terminal 2 cannot sense the data being transmitted by the terminal 1 in power-down mode. The terminal 2 then determines mistakenly that the base station is idle and starts transmitting data packets at full power to the base station 3. The data transmission from the terminal 2 disrupts the ongoing reception by the base station 3 of data packets from the terminal 1.

The interference with data reception caused by the deficient functioning of the carrier sense feature has been known as the hidden-terminal problem. The phenomenon can occur not only when the terminals 1 and 2 and the base station 3 are distanced from one another as shown in FIG. 1, but also when obstructions exist between the terminals or between a terminal and the base station.

The IEEE 802.11 standard stipulates that RTS (Request To Send) and CTS (Clear To Send) frames be used to resolve the hidden-terminal problem. What follows is a description of how RTS and CTS frames are typically transmitted and received.

Prior to data transmission, the terminal 1 checks the data length of the data to be transmitted, calculates based on the checked data length a busy time in effect from the time an RTS frame is transmitted to the base station 3 until an ACK frame is received from the base station 3 upon completion of the data transmission to the base station 3, and transmits an RTS frame including the busy time information to the base station 3.

Upon normal receipt of the RTS frame from the terminal 1, the base station 3 transmits within the service area 11 a CTS frame including information about the busy time calculated to be in effect from the time the RTS frame is normally received from the terminal 1 until an ACK frame is sent out following the reception of data from the terminal 1 subsequent to the self-executed CTS transmission. On receiving the CTS frame, the terminal 2 recognizes the busy time for communication between the base station 3 and the terminal 1 and sets accordingly a data transmission-prohibited interval. After normally receiving the CTS frame, the terminal 1 transmits data to the base station 3. Upon normal receipt of data packets from the terminal 1, the base station 3 returns an ACK frame.

The busy time information included in RTS and CTS frames denotes the time calculated to be in effect before an ACK frame is transmitted by the base station 3. The terminal 2 or any other terminal that could potentially become a hidden terminal recognizes the busy time of the available transmission channel upon receipt of an RTS or CTS frame and takes measures to stop transmitting data packets during that time interval so as to avoid collision with transmitted data.

However, there are cases such as one shown in FIG. 3 in which, when the terminal 1 transmits an RTS frame at low power to the base station 3, the terminal 2 does not recognize the start of data transmission and reception between the terminal 1 and the base station 3 until a CTS frame is received from the base station 3. In that case, the terminal 2 determines mistakenly that the base station 3 is idle and starts transmitting an RTS frame or data packets at full power to the base station 3. This can cause interference with the data communication between the terminal 1 and the base station 3.

That is, even if RTS and CTS frames are used, data communication between the base station 3 and the terminal 1 in low power mode can be disrupted by the transmission of data packets or an RTS frame at full power by the terminal 2.

As described above, a problem persists in a wireless LAN system having the service area 11 in which coexist a plurality of terminals including one (e.g., terminal 2) always transmitting data at full power and others (e.g., terminal 1) capable of transmitting data in power-down mode. In such a LAN system setup, data transmission by the terminal 1 in power-down mode is liable to be disrupted by the terminal 2 always transmitting data at full power.

SUMMARY OF THE INVENTION

The present invention has been made in view of the above circumstances and provides arrangements for preventing one terminal from interfering with data transmission by another terminal during wireless communication in low power mode.

According to the present invention, there is provided a first information processing apparatus including: communicating means for transmitting data to administrative system and for transmitting or receiving information for controlling wireless communication with the administrative system; measuring means for measuring a reception level of the information or of the data being received by the communicating means; and controlling means for controlling transmission power in a manner allowing the communicating means to transmit the information or the data; wherein the controlling means controls the transmission power in such a manner that a first item of the information signaling a start of transmission of the data is transmitted at a maximum controllable transmission power level or at a first transmission power level close to the maximum controllable transmission power level; and wherein, if a second item of the information is transmitted by the administrative system based on the first information item to enable the start of transmission of the data and is received by the communicating means, then the measuring means measures a reception level of the second information item and the controlling means controls the power for transmitting the data based on the reception level measured by the measuring means.

Preferably, the first information processing apparatus above may further include a plurality of amplifying means for amplifying a signal level for transmitting the first information item or the data; wherein the plurality of amplifying means may amplify the signal level at different amplification factors; and wherein the controlling means may control the power for transmitting the first information item or the data by selecting any one of the plurality of amplifying means.

Preferably, the controlling means may compare a data length of the data to be transmitted with a threshold value; if the data length is less than the threshold value, then the controlling means may exercise control in such a manner that the data is transmitted at the first transmission power level; and if the data length is greater than the threshold value, then the controlling means may exercise control in such a manner that the data is transmitted at a second transmission power level lower than the first transmission power level.

Preferably, the communication with the administrative system may be carried out according to IEEE 802.11 standards, and the first information item may be an RTS frame and the second information item may be a CTS frame.

According to the present invention, there is provided a first information processing method including the steps of: firstly controlling transmission power in such a manner that first information signaling a start of transmission of data is transmitted at a maximum controllable transmission power level or at a first transmission power level close to the maximum controllable transmission power level; controlling reception of second information transmitted by administrative system based on the first information, the second information enabling the start of transmission of the data; measuring a reception level of the second information; and secondly controlling transmission power in such a manner that the data is transmitted at a transmission power level based on the reception level of the second information measured in the measuring step.

According to the present invention, there is provided a first recording medium which stores a program including the steps of: firstly controlling transmission power in such a manner that first information signaling a start of transmission of data is transmitted at a maximum controllable transmission power level or at a first transmission power level close to the maximum controllable transmission power level; controlling reception of second information transmitted by administrative system based on the first information, the second information enabling the start of transmission of the data; measuring a reception level of the second information; and secondly controlling transmission power in such a manner that the data is transmitted at a transmission power level based on the reception level of the second information measured in the measuring step.

According to the present invention, there is provided a first program including the steps of: firstly controlling transmission power in such a manner that first information signaling a start of transmission of data is transmitted at a maximum controllable transmission power level or at a first transmission power level close to the maximum controllable transmission power level; controlling reception of second information transmitted by administrative system based on the first information, the second information enabling the start of transmission of the data; measuring a reception level of the second information; and secondly controlling transmission power in such a manner that the data is transmitted at a transmission power level based on the reception level of the second information measured in the measuring step.

In the first information processing apparatus, the first information processing method, and the first program according to the invention are in use, the first information signaling the start of data transmission is transmitted at a maximum controllable transmission power level or at a first transmission power level close to that maximum controllable transmission power level. The second information transmitted by the administrative system based on the first information is then received, the second information enabling the start of transmission of the data. A reception level of the second information is measured. Then data is transmitted at a transmission power level based on the measured reception level of the second information.

According to the present invention, there is provided a second information processing apparatus including communicating means which receives information from administrative system and which, on transmitting data to another information processing apparatus, transmits the data to the administrative system and transmits second information.

Preferably, the communicating means may designate an address of the second information processing apparatus above as a receiving address in the second information before transmitting that second information.

Preferably, the second information processing apparatus above may further include: measuring means for measuring a reception level of the information received by the communicating means from the administrative system or of the data transmitted by the administrative system to the other information processing apparatus; and controlling means for controlling transmission power in a manner allowing the communicating means to transmit the second information and the data; wherein the communicating means may communicate wirelessly with the administrative system; and wherein the controlling means may control transmission power in such a manner that the second information is transmitted at a maximum controllable transmission power level or at a first transmission power level close to the maximum controllable transmission power level, and that the data is transmitted thereafter at a transmission power level based on the reception level measured by the measuring means.

Preferably, the second information processing apparatus above may further include a plurality of amplifying means for amplifying a signal level for transmitting the second information or the data; wherein the plurality of amplifying means may amplify the signal level at different amplification factors; and wherein the controlling means may control the power for transmitting the second information or the data by selecting any one of the plurality of amplifying means.

Preferably, the controlling means may compare a data length of the data to be transmitted with a threshold value; if the data length is less than the threshold value, then the controlling means may exercise control in such a manner that the data is transmitted at the first transmission power level; and if the data length is greater than the threshold value, then the controlling means may exercise control in such a manner that the data is transmitted at a second transmission power level lower than the first transmission power level.

Preferably, communication with the administrative system may be carried out according to IEEE 802.11 standards, and the first information may be an RTS frame and the second information may be a CTS frame.

According to the present invention, there is provided a second information processing method including the steps of: firstly controlling transmission of second information; and secondly controlling transmission of data to another information processing apparatus via administrative system.

According to the present invention, there is provided a second recording medium which stores a program including the steps of: firstly controlling transmission of second information; and secondly controlling transmission of data to another information processing apparatus via administrative system.

According to the present invention, there is provided a second program including the steps of: firstly controlling transmission of second information; and secondly controlling transmission of data to another information processing apparatus via administrative system.

In the second information processing apparatus, the second information processing method, and the second program according to the invention are in use, the first information requesting permission of the start of data transmission is sent from one apparatus to the administrative system during normal processing. The administrative system returns the second information enabling the start of data transmission. Given the second information, data is transmitted from the apparatus to another apparatus via the administrative system.

BRIEF DESCRIPTION OF THE DRAWINGS

FIG. 9 is a schematic view showing a data structure of the RTS frame.

DETAILED DESCRIPTION

Best Mode for Carrying Out the Invention

Preferred embodiments of the present invention will now be discussed with reference to the accompanying drawings.

Figure 4:
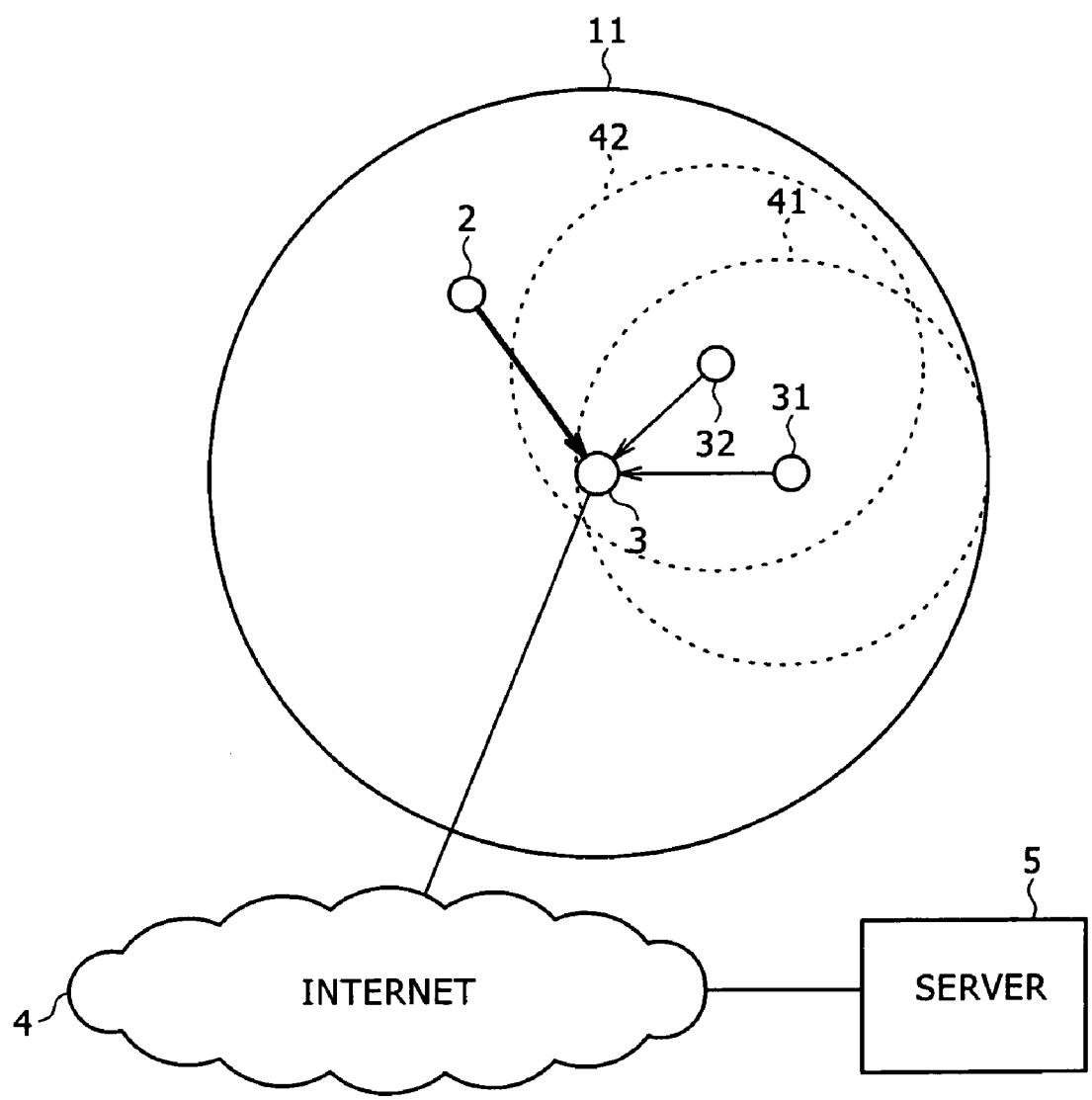
FIG. 4 is a block diagram outlining a wireless LAN system according to the present invention.

Described below with reference to FIG. 4 is a wireless LAN system offering a service area in which two kinds of terminals coexist: one that always transmits data at full power, and another capable of transmitting power in power-down mode.

Figure 1:
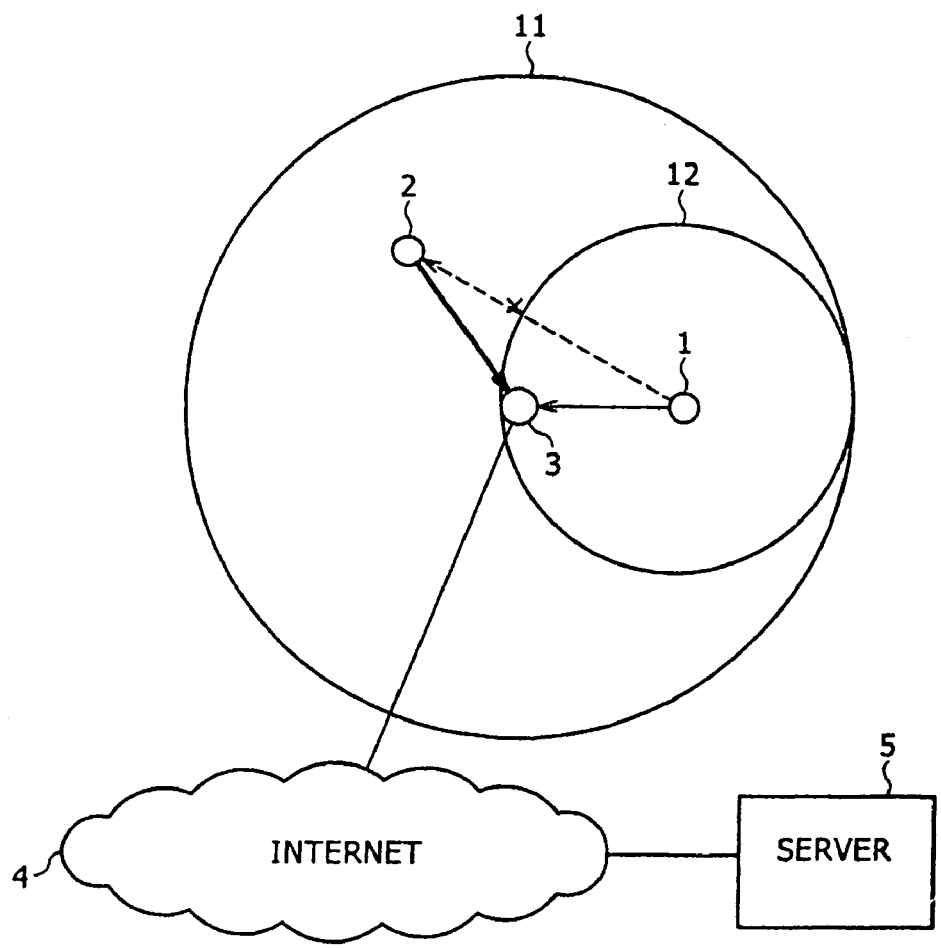
FIG. 1 is a block diagram outlining a wireless LAN system in related art.
Figure 2:
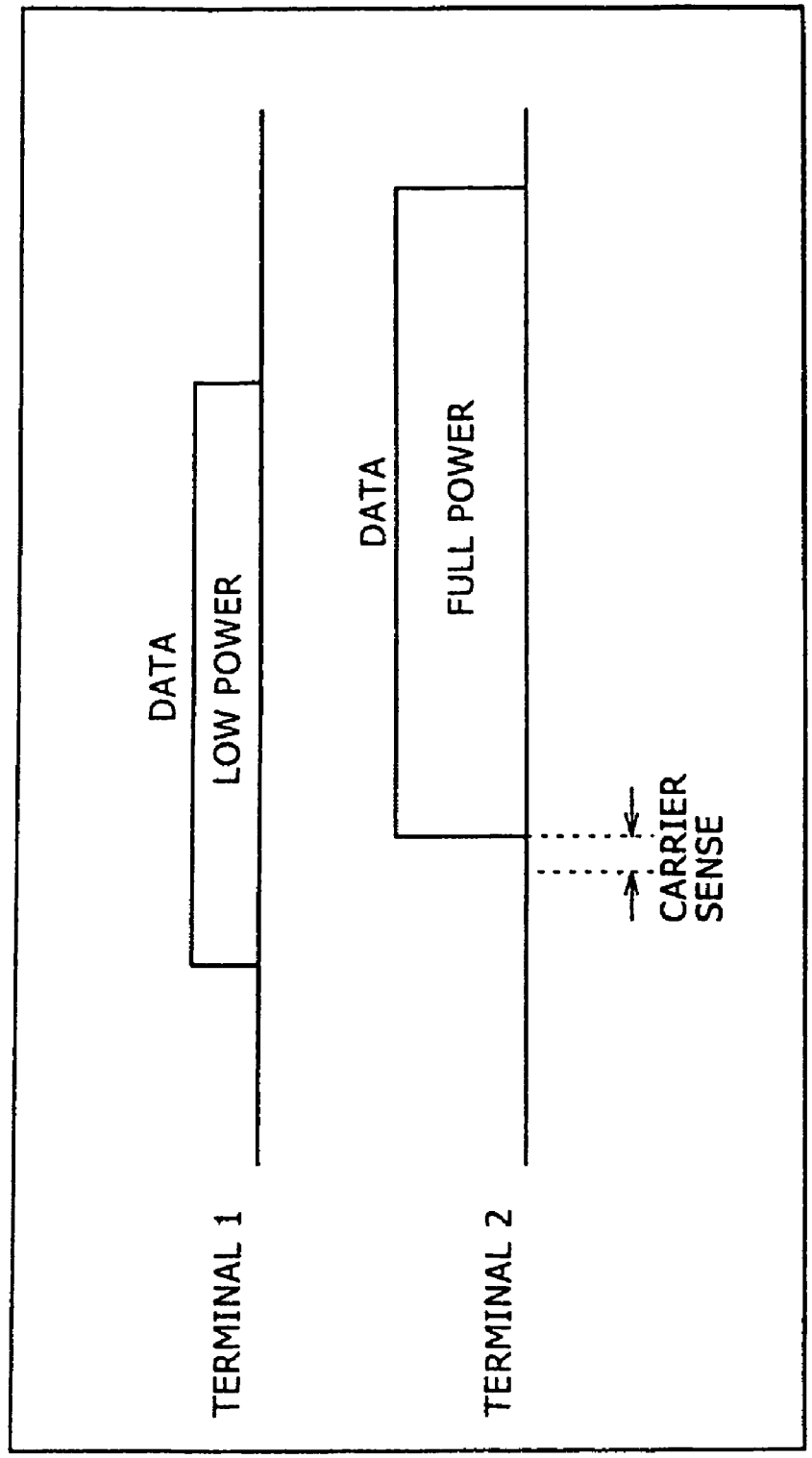
FIG. 2 is an explanatory view showing a carrier-sense operation during data transmission at low power.

In the description that follows, like reference numerals used earlier in describing the conventional system designate like or corresponding parts, and their descriptions will be omitted where redundant. The wireless LAN system of FIG. 4 is basically the same in structure as the conventional wireless LAN system of FIG. 1, except that the terminal 1 in FIG. 1 is replaced in FIG. 4 by terminals 31 and 32 to which this invention is applied.

The terminals 31 and 32 are capable of transmitting data or communication control information such as CTS and RTS frames in low power mode to the server 5 via the base station 3 and the Internet 4. The extent to which the terminal 31 can transmit data or communication control information in low power mode is a radius 41 that is approximately the same as the distance between the terminal 31 and the base station 3; the extent to which the terminal 32 can transmit data or communication control information in low power mode is a radius 42 that is about the same as the distance between the terminal 32 and the base station 3. A terminal 2, outside the radii 41 and 42, is incapable of sensing a carrier of the data or communication control information being transmitted by the terminals 31 and 32 in low power mode. On the other hand, when the terminals 31 and 32 transmit data or communication control information in full power mode, i.e., at a maximum controllable transmission power level or at a transmission power level close to it, the terminal 2 can sense the carrier of the data or communication control information being transmitted by the terminals 31 and 32.

Figure 5:
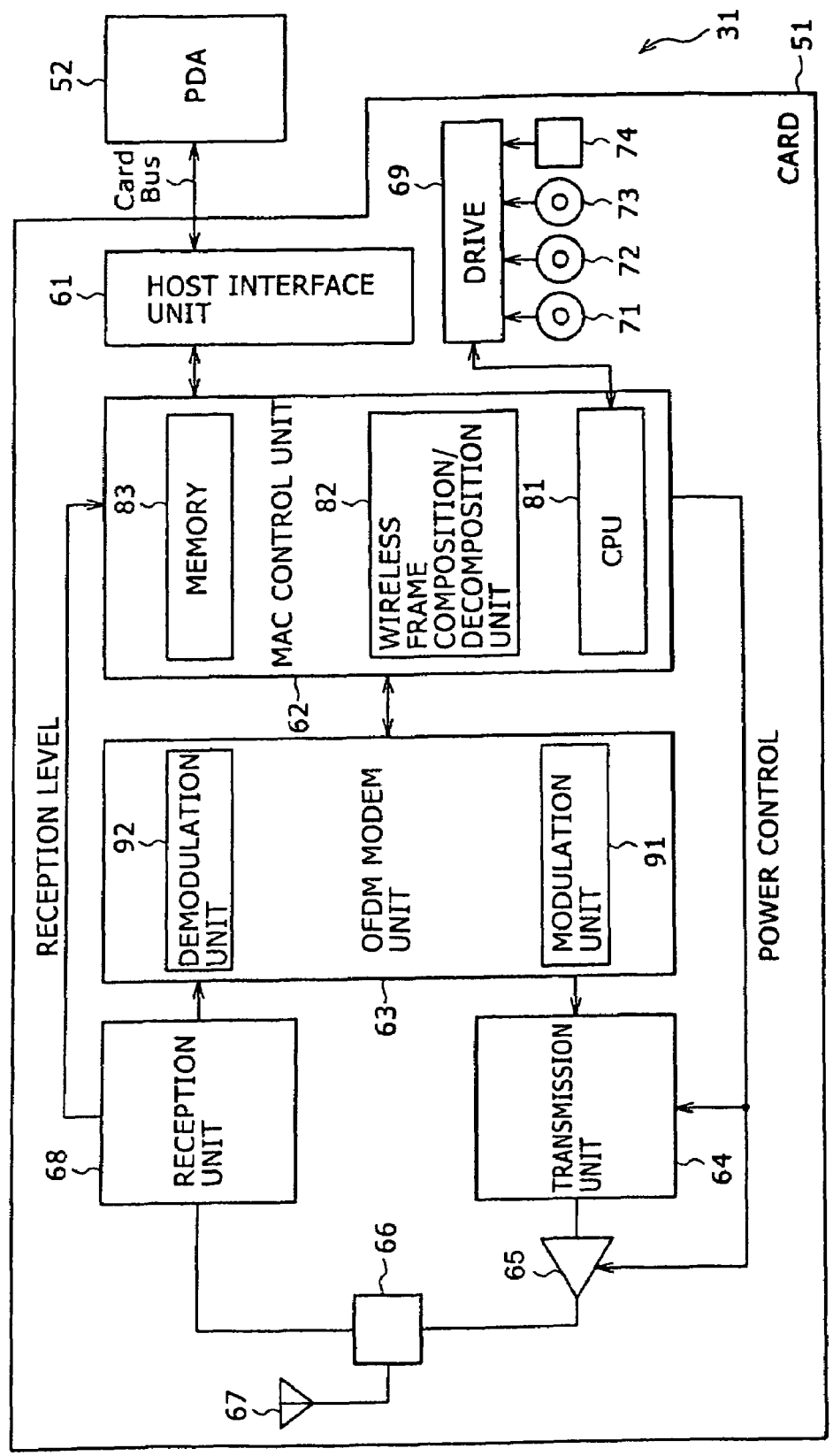
FIG. 5 is a block diagram showing a typical structure of a terminal indicated in FIG. 4.

FIG. 5 is a block diagram showing a typical structure of the terminal 31 to which this invention is applied. The terminal 31 is composed of a PDA (Personal Digital (Data) Assistant) 52 and a card 51 which is attached to the PDA 52 and which carries out wireless communication processes. It is assumed here that the terminal 31 communicates wirelessly with the base station 3 over a frequency band of 5 GHz using OFDM (Orthogonal Frequency Division Multiplexing) as the modulation scheme.

A host interface unit 61 interfaces with the PDA 52. In operation, the host interface unit 61 inputs data for transmitting from the PDA 52 via a card bus and forwards the data to a MAC control unit 62. Furthermore, the host interface unit 61 admits signals received and processed by the MAC control unit 62 and outputs the signals via the card bus to the PDA 52, a host device of the card 51.

The MAC control unit 62 includes a CPU 81, a wireless frame composition/decomposition unit 82, and a memory 83. The wireless frame composition/decomposition unit 82 composes the transmitting data or communication control information supplied from the host interface unit 61 into wireless frames and supplies the composed frames to a modulation unit 91. Furthermore, the wireless frame composition/decomposition unit 82 receives wireless frames from a demodulation unit 92, decomposes the received frames into digital data, and feeds the data to the host interface unit 61. The CPU 81 controls the processing of the card 51 as a whole. More specifically, the CPU 81 controls CSMA/CA (Carrier Sense Multiple Access/Collision Avoidance), transmission and reception of RTS and CTS frames, timings for transmitting and receiving data or communication control information, power levels for transmitting data or communication control information, and retransmission of the data or the communication control information. The memory 83 retains a reception level supplied from a reception unit 68. Based on the reception level which is kept in the memory 83 and which has supplied from the reception unit 68, the CPU 81 controls the power for transmitting data or communication control information.

A drive 69 is connected as needed to the CPU 81. The drive 69 is loaded with a magnetic disk 71, an optical disk 72, a magneto-optical disk 73, or a semiconductor memory 74 so as to exchange information with the CPU 81.

An OFDM modem unit 63 includes the modulation unit 91 and demodulation unit 92. The modulation unit 91 modulates by OFDM the transmitting data or communication control information fed from the MAC control unit 62 and composed of wireless frames, and supplies the OFDM signal thus generated to a transmission unit 64. The demodulation unit 92 demodulates the OFDM signal from the reception unit 68 into digital data and transmits the demodulated data to the MAC control unit 62.

The transmission unit 64 receives an OFDM-modulated signal supplied from the modulation unit 91 in the OFDM modem unit 63. Under control of the CPU 81, the transmission unit 64 controls the power for the supplied signal before transmitting the signal to a power amplifier 65. The power amplifier 65 amplifies the supplied signal under control of the CPU 81 and forwards the amplified signal to an antenna 67 through an antenna switch 66.

The antenna 67 receives an OFDM signal (received signal) transmitted from the base station 3 or from another terminal 31 and forwards the received signal to the reception unit 68, or transmits an OFDM signal (transmitting signal) processed by the transmission unit 64 and amplified by the power amplifier 65. The antenna switch 66 controls signal exchanges in such a manner that the signal received by the antenna 67 is transmitted to the reception unit 68 during a receiving process and that the signal processed by the transmission unit 64 and amplified by the power amplifier 65 is forwarded to the antenna 67 during a transmitting process. The reception unit 68 detects a reception level of the signal received and supplied by the antenna 67, transmits the detected reception level to the MAC (Media Access Control) control unit 62, and forwards the received signal to the OFDM modem unit 63.

How the card 51 of FIG. 5 works will now be described. The host interface unit 61 is supplied with data from the PDA 52 and transmits the supplied data to the MAC control unit 62. The wireless frame composition/decomposition unit 82 in the MAC control unit 62 composes the data coming from the host interface unit 61 or the communication control information from the CPU 81 into wireless frames and transmits the composed frames to the modulation unit 91 in the OFDM modem unit 63. The modulation unit 91 in the OFDM modem unit 63 generates an OFDM signal by modulating through OFDM an outgoing signal composed of wireless frames and coming from the MAC control unit 62, and supplies the OFDM signal thus generated to the transmission unit 64.

Where there is outgoing data to be transmitted, the CPU 81 checks to determine whether or not a carrier-sense operation needs to be performed beforehand, or whether or not data can be transmitted following the transmission and reception of an RTS and a CTS frame. In the latter case, the CPU 81 first checks to see whether or not the received CTS indicates that some other terminal is transmitting data and that a data transmission-prohibited interval is still in effect. If the data transmission-prohibited interval is no longer in effect, the CPU 81 transmits an RTS frame, receives a CTS frame, and determines whether or not the received CTS indicates that is allowed to be transmitted.

If the CPU 81 determines that data can be transmitted, the CPU 81 generates a control signal based on the reception level which is kept in the memory 83 and which has been received from the reception unit 68, the control signal being arranged so as to control the power for transmitting the data. The generated control signal is supplied to the transmission unit 64 and power amplifier 65.

The transmission unit 64 receives an OFDM-modulated signal from the modulation unit 91 in the OFDM modem unit 63 and, under control of the CPU 81, controls the power for the supplied signal before transmitting the signal to the power amplifier 65. The power amplifier 65 amplifies the supplied signal under control of the CPU 81 and forwards the amplified signal to the antenna 67 through the antenna switch 66. The antenna switch 66 controls data exchanges in such a manner that the data or communication control information processed by the transmission unit 64 and amplified by the power amplifier 65 is forwarded to the antenna 67 during a data transmitting process. The OFDM-modulated signal is transmitted from the antenna 67 to the base station 3.

The antenna 67 receives an OFDM signal (received signal) transmitted from the base station 3 or from another terminal 31 and supplies the received signal to the reception unit 68 via the antenna switch 66. The antenna switch 66 controls data exchanges in such a manner that the incoming signal received by the antenna 67 is fed to the reception unit 68 during a receiving process. The reception unit 68 detects a reception level of the incoming signal received and supplied by the antenna 67, transmits the detected reception level to the MAC control unit 62, and forwards the received signal to the OFDM modem unit 63. The memory 83 of the MAC control unit 62 retains the reception level of the received signal thus supplied.

The demodulation unit 92 in the OFDM modem unit 63 demodulates the OFDM signal supplied from the reception unit 68 into digital data, and forwards the demodulated digital data to the MAC control unit 62. Upon receipt of the digital data in wireless frames from the demodulation unit 92, the wireless frame composition/decomposition unit 82 in the MAC control unit 62 decomposes the wireless frames in order to supply the communication control information to the CPU 81 or to transmit the data to the host interface unit 61. Based on the signal supplied from the wireless frame composition/decomposition unit 82, the CPU 81 controls the operation of the card 51. The host interface unit 61 receives the data processed and supplied by the MAC control unit 62, and outputs the received data via the card bus to the PDA 52 which is the host device of the card 51.

In the terminal 31 described above with reference to FIG. 5, the CPU 81 in the MAC control unit 62 of the card 51 was shown controlling the power amplifier 65 to change transmission power. However, if the power amplifier is constituted by a commonly-used, highly linear amplifier, it is difficult significantly to reduce the current consumed by the terminal 31 even as the CPU 81 controls the amplifier to bring about reductions in transmission power.

On the other hand, the terminal 32 utilizes a high-power amplifier and a low-power amplifier alternately for amplifying outgoing signals. One of the two amplifiers is used selectively for data packet transmission. When transmission power is lowered by such an amplifier setup, the current consumed by the terminal 32 is reduced appreciably.

Figure 6:
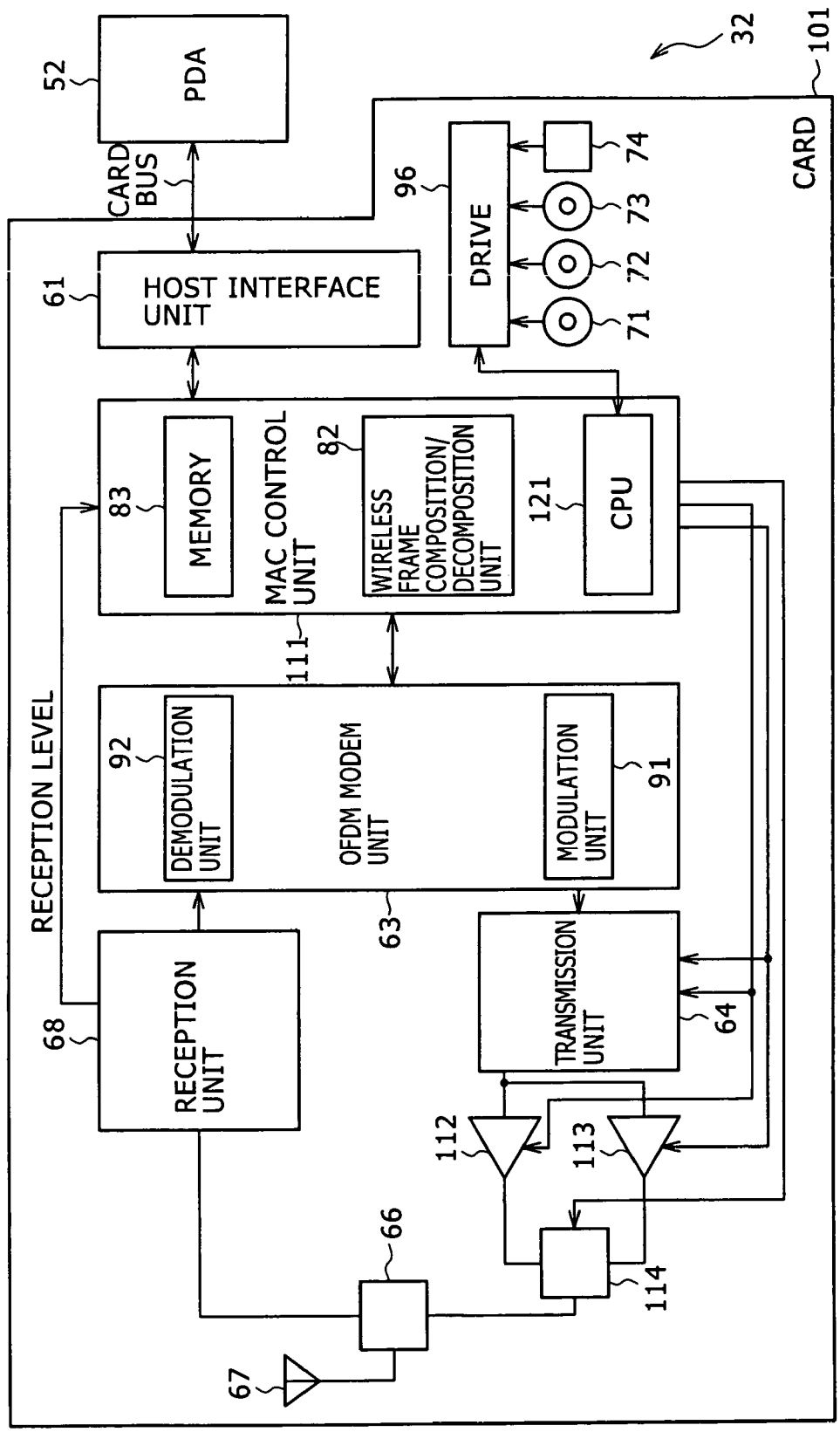
FIG. 6 is a block diagram showing another terminal structure different from the structure in FIG. 5 of the terminal in FIG. 4.

FIG. 6 is a block diagram showing another structure of the terminal 32. Of the reference characters in FIG. 6, those already used in FIG. 5 designate like or corresponding parts, and their descriptions will be omitted where redundant.

A card 101 attached to the PDA 52 as a replacement of the card 51 in FIG. 5 is basically the same in structure as the card 51, except that the MAC control unit 62 is replaced by a MAC control unit 111 and the power amplifier 65 by a high-power amplifier 112 and a low-power amplifier 113 combined with an amplifier switch 114. The MAC control unit 111 is basically the same in structure as the MAC control unit 111 in FIG. 5 except that the CPU 81 is replaced by a CPU 121.

The CPU 121 in the MAC control unit 111 controls the operation of the card 101. If the CPU 121 determines that data can be transmitted, the CPU 121 generates a control signal by which to control the power for transmitting the transmitting data based on the reception level which is stored in the memory 83 and which has been supplied from the reception unit 68. The control signal thus generated is supplied to the transmission unit 64, high-power amplifier 112, low-power amplifier 113, and power switch 114.

The transmission unit 64 supplies a transmitting OFDM signal to the high-power amplifier 112 or low-power amplifier 113 under control of the CPU 121 in the MAC control unit 111. The high-power amplifier 112 amplifies the supplied OFDM signal for full power data transmission under control of the CPU 121 in the MAC control unit 111; the low-power amplifier 113 amplifies the OFDM signal for low power data transmission under control of the CPU 121 in the MAC control unit 111.

For full power data transmission under control of the CPU 121, the power switch 114 feeds the output of the high-power amplifier 112 to the antenna switch 66; for low power data transmission, the power switch 114 supplies the output of the low-power amplifier 113 to the antenna switch 66.

Although the setup in FIG. 6 is shown having one of the two amplifiers, high-power amplifier 112 or low-power amplifier 112, selected to control transmission power, this is not limitative of the invention. Alternatively, any number of amplifiers greater than two may be used. In such a case, the CPU 121 may select any one of the multiple amplifiers for transmission power control based on suitable power control values.

In FIGS. 5 and 6, the card 51 or 101 is shown attached to the PDA 52 to let the terminal 31 or 32 carry out wireless communication. However, this is not limitative of the invention. The card 51 or 101 may be attached to the PDA 51 not only in detachable fashion but also on an integrated basis (i.e., undetachably). As another alternative, the PDA 52 may be internally equipped with a communication processing unit having the same structure as that of the card 51 or 101.

Furthermore, the card 51 or 101 may be attached removably not only to the PDA 52 but also to some other information processing apparatus such as a personal computer or a mobile phone. That information processing apparatus may be furnished integrally with the card 51 or 101, or the apparatus may incorporate a communication processing unit having the same structure as that of the card 51 or 101.

The terminal 2 incapable of transmitting data in low power mode is basically the same as the terminal 31 or 32 structurally and in terms of the workings for data transmission and reception. The terminal 2 will not be discussed further, because the only difference is that the reception unit 68 will not detect receptions levels and that the CPU 81 or 121 will not control transmission power.

Figure 7:
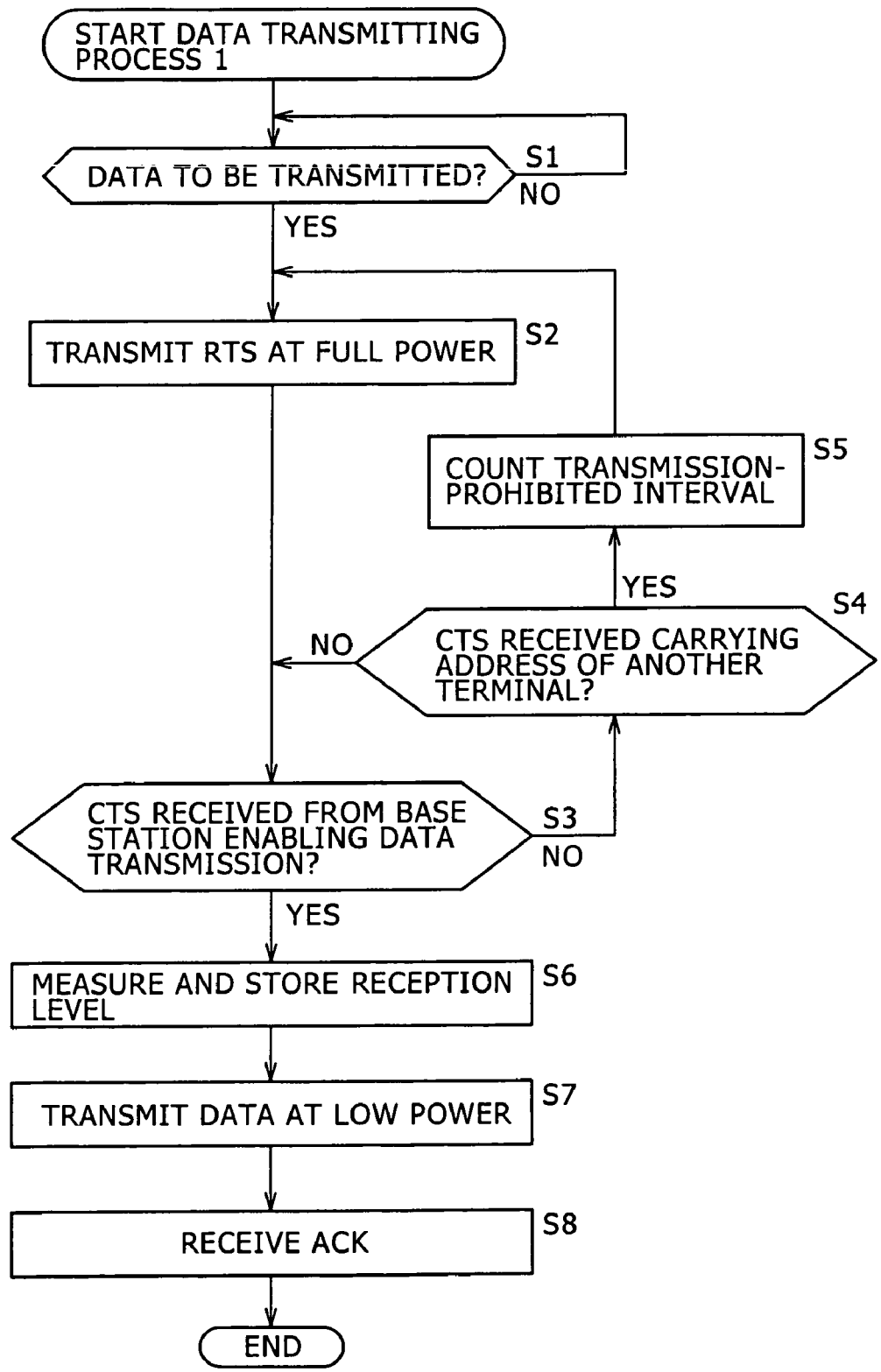
FIG. 7 is a flowchart of steps constituting a data transmitting process 1.

Described below with reference to the flowchart of FIG. 7 is the data transmitting process 1 carried out by the terminal 31 or 32.

In step S1, the CPU 81 of the MAC control unit 62 or the CPU 121 in the MAC control unit 111 determines whether or not to transmit data to the base station 3 based on the signal supplied from the PDA 52 via the host interface unit 61. If it is determined in step S1 that data is not to be transmitted, step S1 is repeated until the CPU deems it appropriate to transmit data based on the supplied signal.

If it is determined in step S1 that data is to be transmitted, step S2 is reached. In step S2, the CPU 81 in the MAC control unit 62 or the CPU 121 in the MAC control unit 111 causes the wireless frame composition/decomposition unit 82 to produce an RTS frame and the modulation unit 91 in the OFDM modem unit 63 to modulate the frame through OFDM. The CPU 81 in the MAC control unit 62 controls the transmission unit 64 and power amplifier 65, or the CPU 121 in the MAC control unit 111 controls the transmission unit 64, the high-power amplifier 112 and the power switch 114, in such a manner as to amplify the transmitting OFDM signal to a full-power transmission level, before transmitting the RTS to the base station 3 via the antenna switch 66 and antenna 67.

Figure 8:
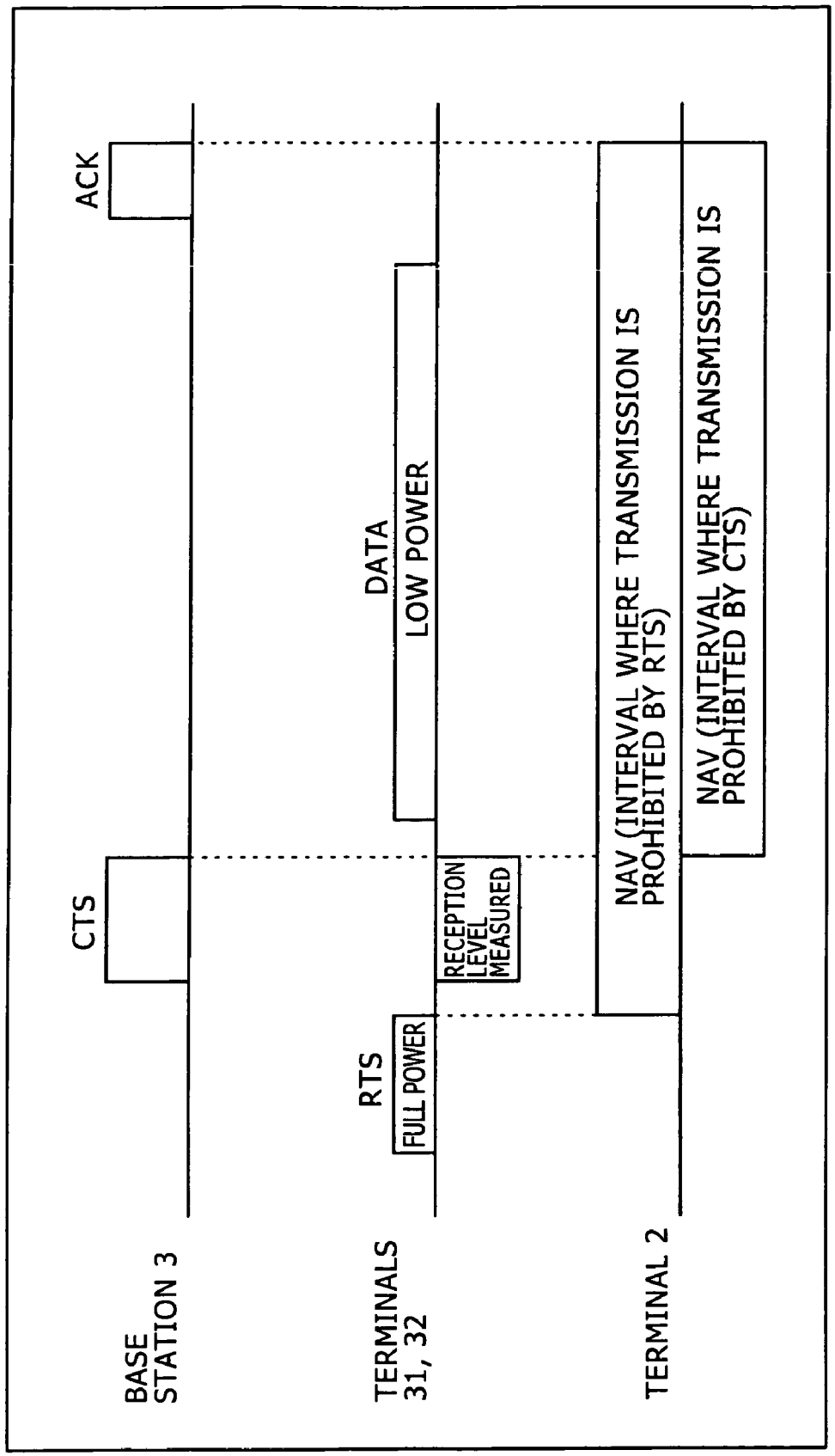
FIG. 8 is an explanatory view showing how an RTS and a CTS frame are used and how data is transmitted and received during the data transmitting process 1 in FIG. 7.

As illustrated in FIG. 8, the terminal 31 or 32 to which this invention is applied transmits the RTS frame at full power. The RTS frame contains information indicating the time required for the terminal 31 or 32 to transmit data packets to the base station 3 and to receive an ACK frame from the base station 3 in return.

FIG. 9 shows a typical RTS format. The RTS frame is made up of a physical sublayer (PHY) header field, a frame control field, a duration field, a receiver address (RA) field, a transmitting address (TA) field, and a frame check sequence (FCS) field. The PHY header field contains signals needed preparatory to communication such as a preamble. The frame control field contains information indicating the content of this packet, i.e., information indicating that this packet is RTS. The duration field contains the time required for the terminal 31 or 32 to transmit data packets to the base station 3 and to receive an ACK frame from the base station 3, i.e., time to occupy the communication channel. The RA field contains the address of the base station 3 for which the RTS frame is destined. The TA field contains the address of this terminal 31 or 32 transmitting the RTS frame. The FCS field contains bits for error check.

On receiving the RTS frame, the terminal 2 references the duration field of the signal and sets accordingly a transmission-prohibited interval called NAV (Network Allocation Vector) as depicted in FIG. 8 (the setting process is performed in steps S21 and S22 of FIG. 12 as will be described later). Upon receipt of the RTS frame, the base station 3 transmits a CTS frame to all terminals within the service area 11 as illustrated in FIG. 8. The CTS frame carries information indicating the time required for the base station 3 to complete an ACK transmission.

Figure 10:
FIG. 10 is a schematic view showing a data structure of the CTS frame.

FIG. 10 shows a typical CTS format. The CTS frame is made up of a PHY header field, a frame control field, a duration field, an RA field, and an FCS field. The PHY header field contains signals needed preparatory to communication such as a preamble. The frame control field contains information indicating the content of this packet, i.e., information indicating that this packet is CTS. The duration field contains the time required for the base station 3 to complete an ACK transmission. The RA field contains the address of the terminal 31 or 32 that has transmitted the RTS frame, the address being written in the TA field of the received RTS. The FCS field contains bits for error check.

An OFDM signal transmitted from the base station 3 and received by the antenna 67 is supplied to the reception unit 68 via the antenna switch 66. The reception unit 68 detects a reception level of the incoming signal, places the detected reception level into the memory 83 of the MAC control unit 62 or 111 for storage, and transmits the supplied signal to the OFDM modem unit 63.

Given the OFDM signal from the reception unit 68, the demodulation unit 92 in the OFDM modem unit 63 demodulates the signal into digital data in wireless frames. The data is fed to the wireless frame composition/decomposition unit 82 in the MAC control unit 62 or 111 whereby the wireless frames are decomposed. If the digital data with its frames decomposed turns out to be communication control information such as CTS, the information is supplied to the CPU 81. If the digital data turns out to be data such as stream data destined for the PDA 52, the data is forwarded to the host interface unit 61.

In step S3, the CPU 81 in the MAC control unit 62 or the CPU 121 in the MAC control unit 111 checks the signal from the wireless frame composition/decomposition unit 82 to determine whether or not the base station 3 has transmitted a CTS frame carrying the address of this terminal, i.e., a signal enabling the terminal to transmit data.

If in step S3 the CTS enabling data transmission is not found received, then step S4 is reached. In step S4, the CPU 81 in the MAC control unit 62 or the CPU 121 in the MAC control unit 111 checks the signal from the wireless frame composition/decomposition unit 82 to determine whether or not the base station 3 has transmitted a CTS frame carrying the address of any other terminal than this one. If in step S4 the CTS carrying the address of another terminal is not found received, control is returned to step S3 and the subsequent steps are repeated.

If in step S4 the CTS frame carrying the address of another terminal is found received, step S5 is reached. In step S5, the CPU 81 in the MAC control unit 62 or the CPU 121 in the MAC control unit 111 references the duration field of the received CTS, sets accordingly a transmission-prohibited interval (NAV), and starts counting the interval. After the transmission-prohibited interval has been counted in step S5, control is returned to step S2 and the subsequent steps are repeated.

If in step S3 the CTS enabling transmission of data is found received, step S6 is reached. In step S6, the reception unit 68 supplies the measured reception level of the received CTS to the MAC control unit 62 or 111. The memory 83 in the MAC control unit 62 or 111 stores the supplied reception level.

In step S7, the CPU 81 in the MAC control unit 62 or the CPU 121 in the MAC control unit 111 transmits the data supplied from the PDA 52 to the wireless frame composition/decomposition unit 82 through the host interface unit 61. In turn, the wireless frame composition/decomposition unit 82 composes the received data into wireless frames before transmitting the data to the OFDM modem unit 63. The modulation unit 91 in the OFDM modem unit 63 modulates the received data by OFDM. The CPU 81 in the MAC control unit 62 controls the transmission unit 64 and power amplifier 65 based on the reception level stored in the memory 83, or the CPU 121 in the MAC control unit 111 controls the transmission unit 64, the low-power amplifier 113, and the power switch 114 based on the reception level stored in the memory 83, in such a manner as to amplify the transmitting OFDM data to a low-power data transmission level. The amplified data packets are transmitted to the base station 3 via the antenna switch 66 and antenna 67.

In step S8, the reception unit 68 receives an ACK signal from the base station 3. This completes the data transmitting process 1.

Figure 11:
FIG. 11 is a schematic view showing a data structure of an ACK frame.

FIG. 11 shows a typical ACK format. This format is made up of a PHY header field, a frame control field, a duration field, an RA field, and an FCS field. The PHY header field contains signals needed preparatory to communication such as a preamble. The frame control field contains information indicating the content of this packet, i.e., information indicating that this packet is an ACK frame. The duration field contains the time required for the base station 3 to complete an ACK transmission. The RA field contains the address of the terminal 31 or 32 that has transmitted the data field. The FCS field contains bits for error check.

As shown in FIG. 8, the terminal 2 having received at least one of an RTS and a CTS frame sets accordingly a transmission-prohibited interval, in steps to be discussed later with reference to FIG. 12. That means the terminal 2 will not transmit data to the base station 3 as long as the terminal 31 or 32 is transmitting data at low power. While the terminal 31 or 32 is transmitting data packets at low power, any other terminal is prevented from transmitting data at full power so that the communication is protected against interference.

Figure 12:
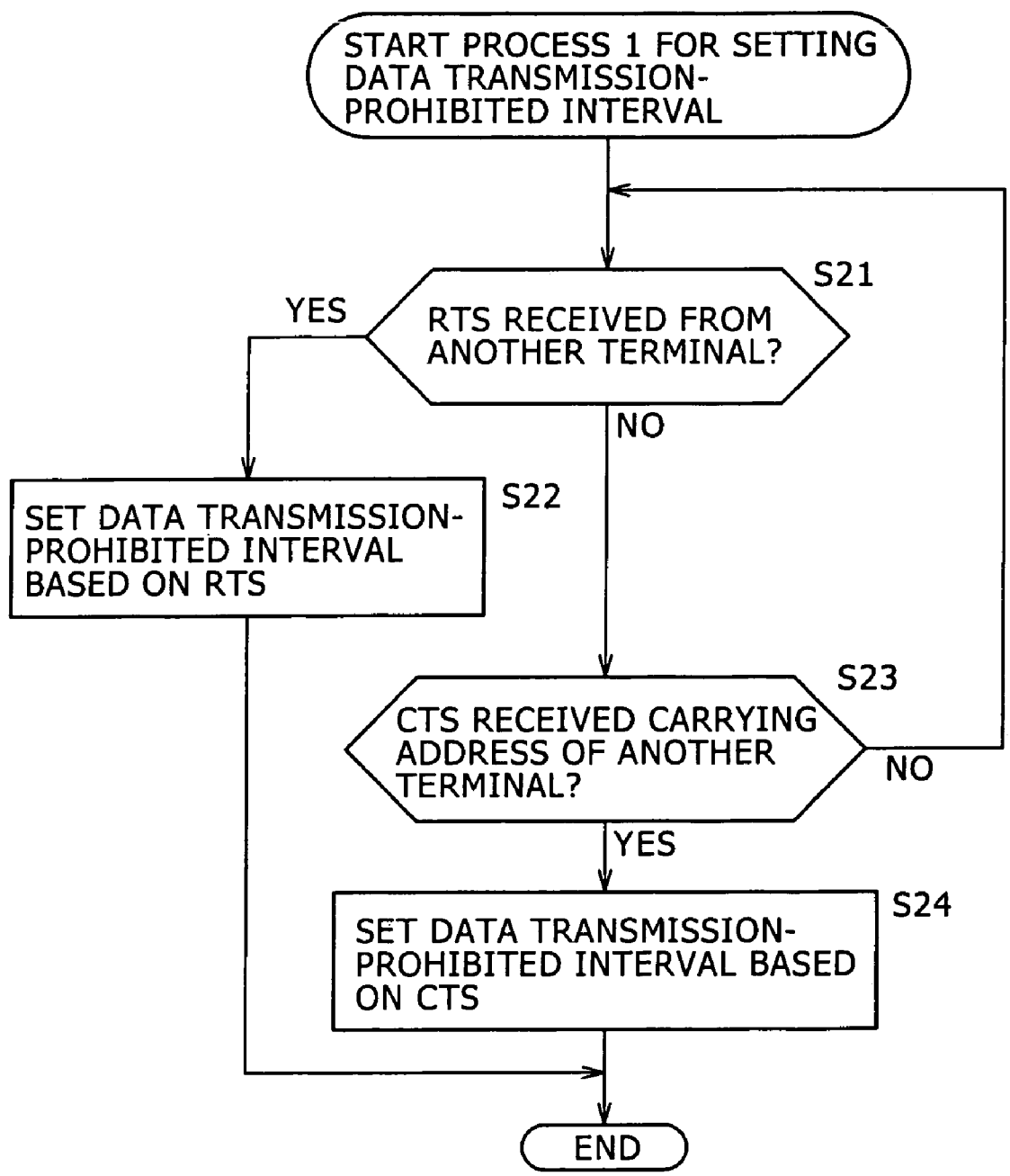
FIG. 12 is a flowchart of steps constituting a process 1 for setting a data transmission-prohibited interval.

Described below with reference to the flowchart of FIG. 12 is the process 1 for setting a data transmission-prohibited interval. This process is carried out by the terminal 2 located in the service area 11 of the base station 3 in which there also exists the terminal 31 or 32 executing the process described above with reference to FIG. 7. It is assumed here that the terminal 2 is basically the same in structure as the terminal 31 explained above with reference to FIG. 5.

In step S21, the CPU 81 in the MAC control unit 62 of the terminal 2 checks to determine whether or not an RTS frame is received from another terminal (e.g., terminal 31 or 32) based on the signal supplied from the wireless frame composition/decomposition unit 82.

If in step S21 an RTS frame is found received from another terminal, step S22 is reached. In step S22, the CPU 81 in the MAC control unit 62 of the terminal 2 sets a data transmission-prohibited interval (NAV) by referencing the duration field in the received RTS. This completes the process 1 for setting the data transmission-prohibited interval.

Figure 3:
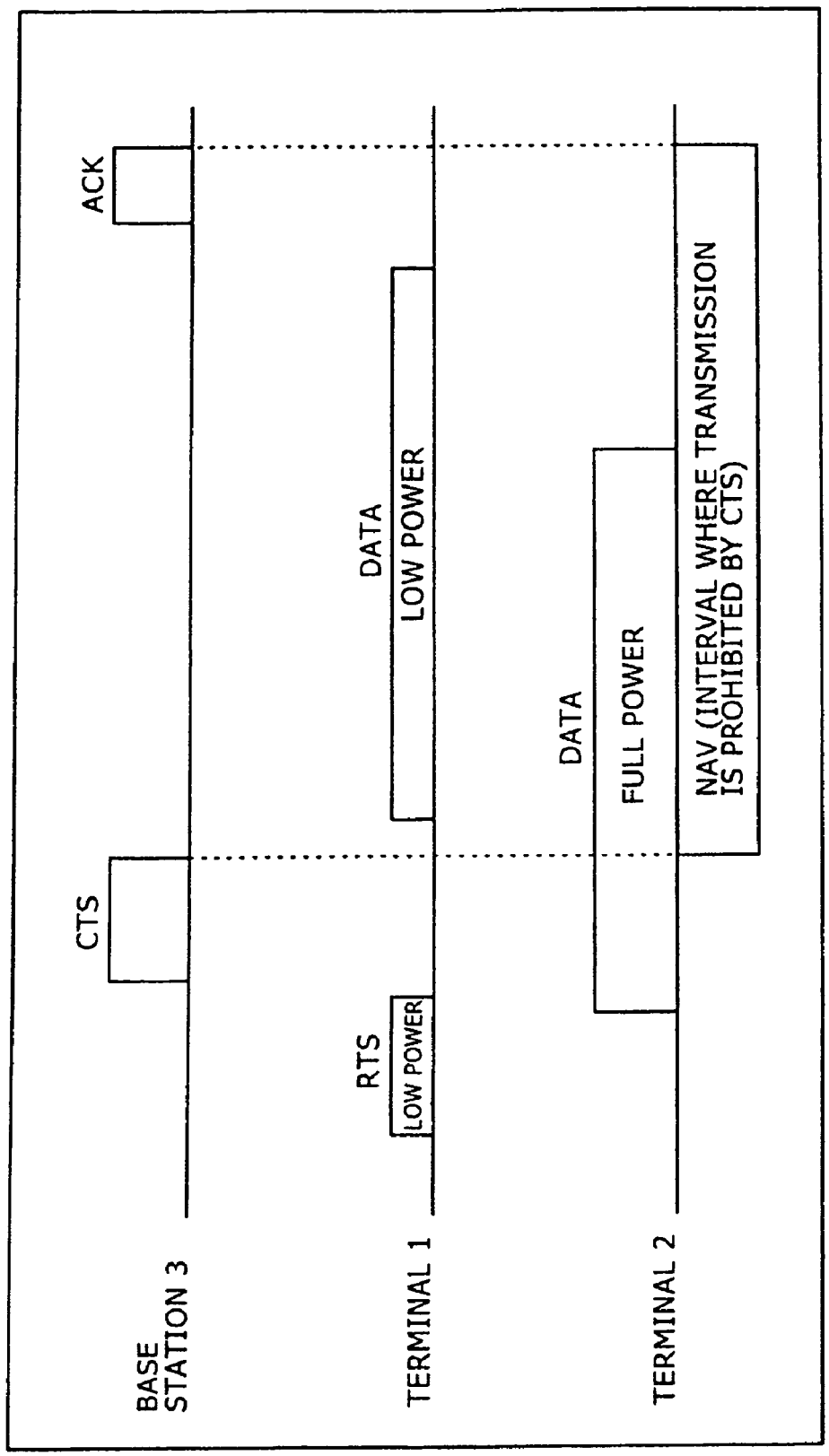
FIG. 3 is an explanatory view showing how an RTS and a CTS frame are used and how data is transmitted and received during data transmission at low power.

As described above, when the terminal 31 or 32 transmits an RTS frame at full power, the terminal 2 is much more likely to receive the transmitted RTS than in the conventional case described above with reference to FIG. 3. Thus the CPU 81 in the MAC control unit 62 of the terminal 2 can set the longer of the two transmission-prohibited intervals (NAV) relative to the RTS shown in FIG. 8. This provides a better protection of the communication started earlier than in the case of FIG. 3 against interference.

If in step S21 the RTS frame from another terminal is not found received, step S23 is reached. In step S23, the CPU 81 in the MAC control unit 62 of the terminal 2 checks to determine whether or not a CTS frame with the RA field containing the address of another terminal (e.g., terminal 31 or 32) is received, based on the signal supplied from the wireless frame composition/decomposition unit 82. If in step S23 the CTS frame with its RA field containing the address of another terminal is not found received, then control is returned to step S21 and the subsequent steps are repeated.

If in step S23 the CTS frame with its RA field containing the address of another terminal is found received, then step S24 is reached. In step S24, the CPU 81 in the MAC control unit 62 of the terminal 2 sets the data transmission-prohibited interval (NAV) by referencing the duration field of the received CTS. This terminates the process 1 for setting the data transmission-prohibited interval.

When the process above is carried out, the terminal 2 is appreciably more likely to receive the RTS frame transmitted at full power by the terminal 31 or 32 than in the conventional case explained above with reference to FIG. 3. This makes it possible for the CPU 81 in the MAC control unit 62 of the terminal 2 to set the longer of the two transmission-prohibited intervals (NAV) relative to the RTS shown in FIG. 8. That in turn provides a better protection of the communication started earlier than in the case of FIG. 3 against interference. Even if the terminal 2 does not receive the RTS frame, the reception of the CTS helps prevent interference with the communication started earlier in low power mode.

In the process discussed above with reference to FIG. 7, an RTS and a CTS frame were shown transmitted and received prior to data packet transmission. However, if the data length of transmitting data is appreciably short and if an RTS and a CTS frame are nevertheless transmitted and received prior to data packet transmission, the practice can entail an unduly long time to occupy the communication channel over which to transmit and receive the RTS and CTS frames, compared with the time required to transmit data packets. The result is an inordinate drop in throughput. That is, the steps for transmitting and receiving RTS and CTS constitute an overhead that leads to worsening throughput. This bottleneck is circumvented by not transmitting data at low power on the basis of the RTS and CTS being transmitted and received. The discontinuation of data transmission at low power based on RTS and CTS transmission and reception permits communications of higher performance than before, with a well-balanced trade-off attained between the reduction in power consumption by the terminal and a boost in throughput.

Figure 13:
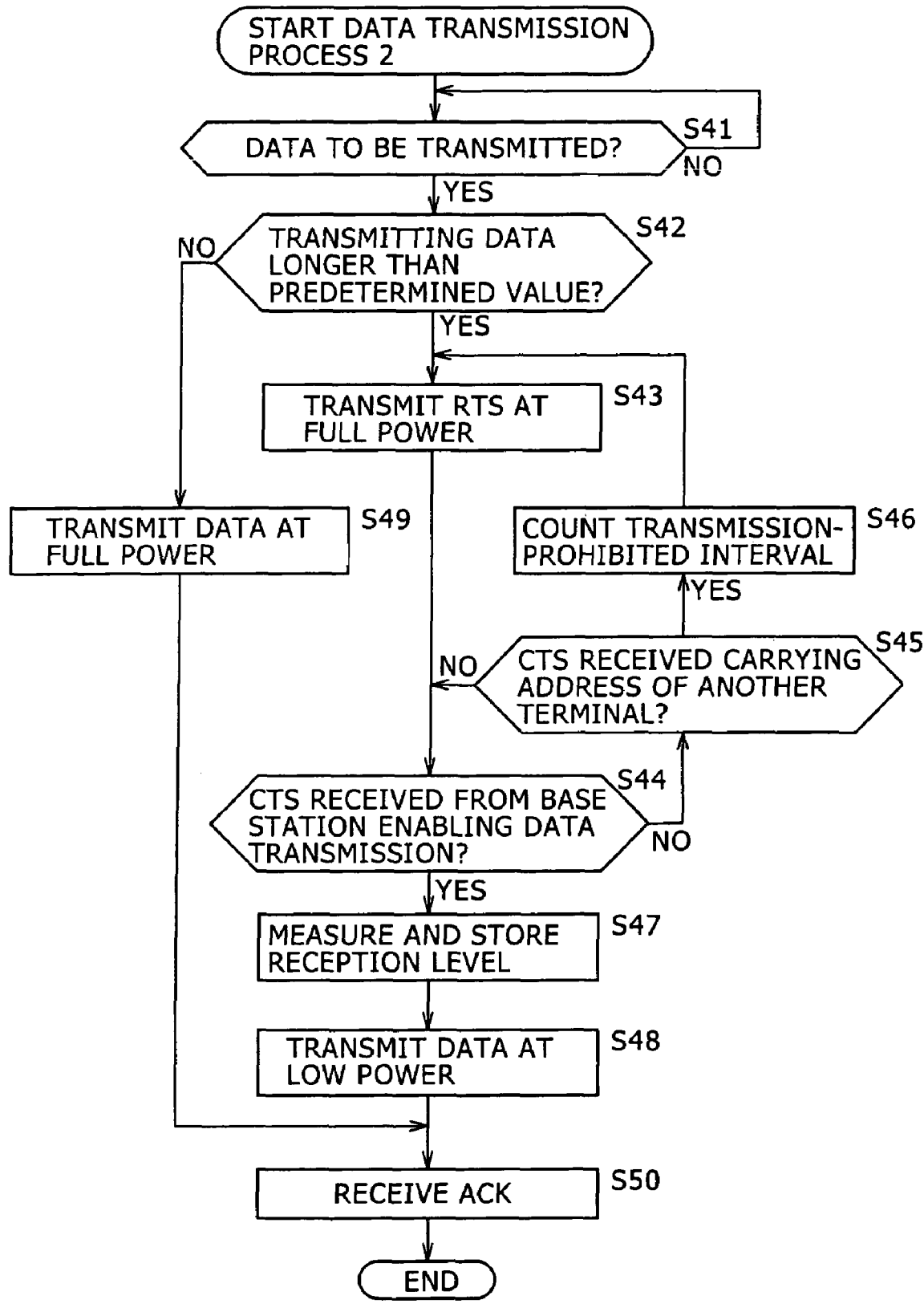
FIG. 13 is a flowchart of steps constituting a data transmitting process 2.

Described below with reference to the flowchart of FIG. 13 is the process 2 for setting a data transmission-prohibited interval. The process is carried out to determine whether or not to transmit data at low power based on the data length of transmitting data.

In step S41, the CPU 81 in the MAC control unit 62 or the CPU 121 in the MAC control unit 111 checks to determine whether or not to transmit data to the base station 3 based on the signal transmitted from the PDA 52 through the host interface unit 61. If it is determined in step S41 that no data is to be transmitted, then step S41 is repeated until it is deemed fit to transmit data.

If it is determined in step S41 that data is to be transmitted, step S42 is reached. In step S42, the CPU 81 in the MAC control unit 62 or the CPU 121 in the MAC control unit 111 checks to determine whether or not the data length of the transmitting data is greater than a predetermined value (i.e., threshold value) on the basis of the data supplied via the host interface unit 61. The threshold value is acquired as a trade-off between the reduction in power consumption by the terminal 31 or 32 and the increase in throughput.

If it is determined in step S42 that the data length of the transmitting data is greater than the threshold value, then steps S43 through S48 are carried out in the same manner as steps S2 through S7 in FIG. 7.

More specifically, an RTS frame is produced and modulated through OFDM. The modulated frame is amplified to a full-power transmission level before being transmitted to the base station 3. Upon receipt of the RTS frame, the terminal 2 references its duration field and sets a transmission-prohibited interval (NAV) accordingly as shown in FIG. 8. The base station 3, on receiving the RTS, transmits a CTS frame to all terminals within the service area 11.

Each terminal checks to determine whether or not a CTS frame with its RA field containing the address of this terminal is received. If such a CTS frame is not found received, another check is made to determine whether or not a CTS frame with its RA field containing the address of another terminal is received. If that CTS frame is found received, the duration field of the received CTS is referenced, and a transmission-prohibited interval (NAV) is set accordingly and counted. If it is determined that a CTS frame with its RA field carrying the address of this terminal is received, i.e., if a CTS frame enabling the transmission of data is found received, then the reception level measured of the received CTS is stored into the memory 83.

The data supplied from the PDA 52 is turned into wireless frames which are then modulated through OFDM. The modulated data is amplified to a low-power data transmission level based on the reception level held in the memory 83. The data thus amplified is transmitted to the base station 3.

If it is determined in step S42 that the data length of the transmitting data is not greater than the threshold value, then step S49 is reached. In step S49, the CPU 81 in the MAC control unit 62 or the CPU 121 in the MAC control unit 111 supplies the wireless frame composition/decomposition unit 82 with the data supplied from the PDA 52. The wireless frame composition/decomposition unit 82 turns the supplied data into wireless frames which are then modulated through OFDM by the modulation unit 91 in the OFDM modem unit 63. The CPU 81 in the MAC control unit 62 controls the transmission unit 64 and power amplifier 65, or the CPU 121 in the MAC control unit 111 controls the transmission unit 64, the high-power amplifier 112 and the power switch 114, in such a manner as to amplify the transmitting OFDM data to a full-power data transmission level. The amplified data packets are transmitted to the base station 3 via the antenna switch 66 and antenna 67.

Upon completion of step S48 or S49, step S50 is reached. In step S50, the reception unit 68 receives an ACK signal from the base station 3. This completes the process of FIG. 13.

In the manner described above, if the length of the data to be transmitted is less than the predetermined value, the data packets are transmitted at full power without transmission and reception of RTS and CTS frames. This helps boost the throughput of data transmission and reception. If the length of the transmitting data is greater than the predetermined value, then RTS and CTS frames are transmitted and received in advance as described above with reference to FIG. 8. The terminal 2 receiving at least one of the RTS and CTS frames sets a transmission-prohibited interval as explained in reference to FIG. 12. Then the terminal 2 will not transmit data to the base station 3 while the terminal 31 or 32 is transmitting data packets at low power. That is, the data transmitted by the terminal 31 or 32 at low power will not be disrupted by the terminal 2 attempting to transmit its own data.

It was shown that the terminal 31 or 32 transmits an RTS frame to the base station 3 which in turns transmits a CTS frame to prevent reductions in throughput due to RTS and CTS transmission and reception. Alternatively, the terminal 31 or 32 may transmit a CTS frame in place of the base station 3 doing so.

If the terminal 31 or 32 is arranged to transmit a CTS frame in place of the base station 3, the terminal 31 or 32 sets a transmission level for data packets based on the reception level of signals such as a beacon emitted periodically (e.g., at 100 msec intervals) by the base station 3. Obviously, the information or data of which the reception unit 68 measures the reception level may alternatively be anything other than the beacon, including communication control information such as CTS or ACK or the data transmitted to another terminal.

Figure 14:
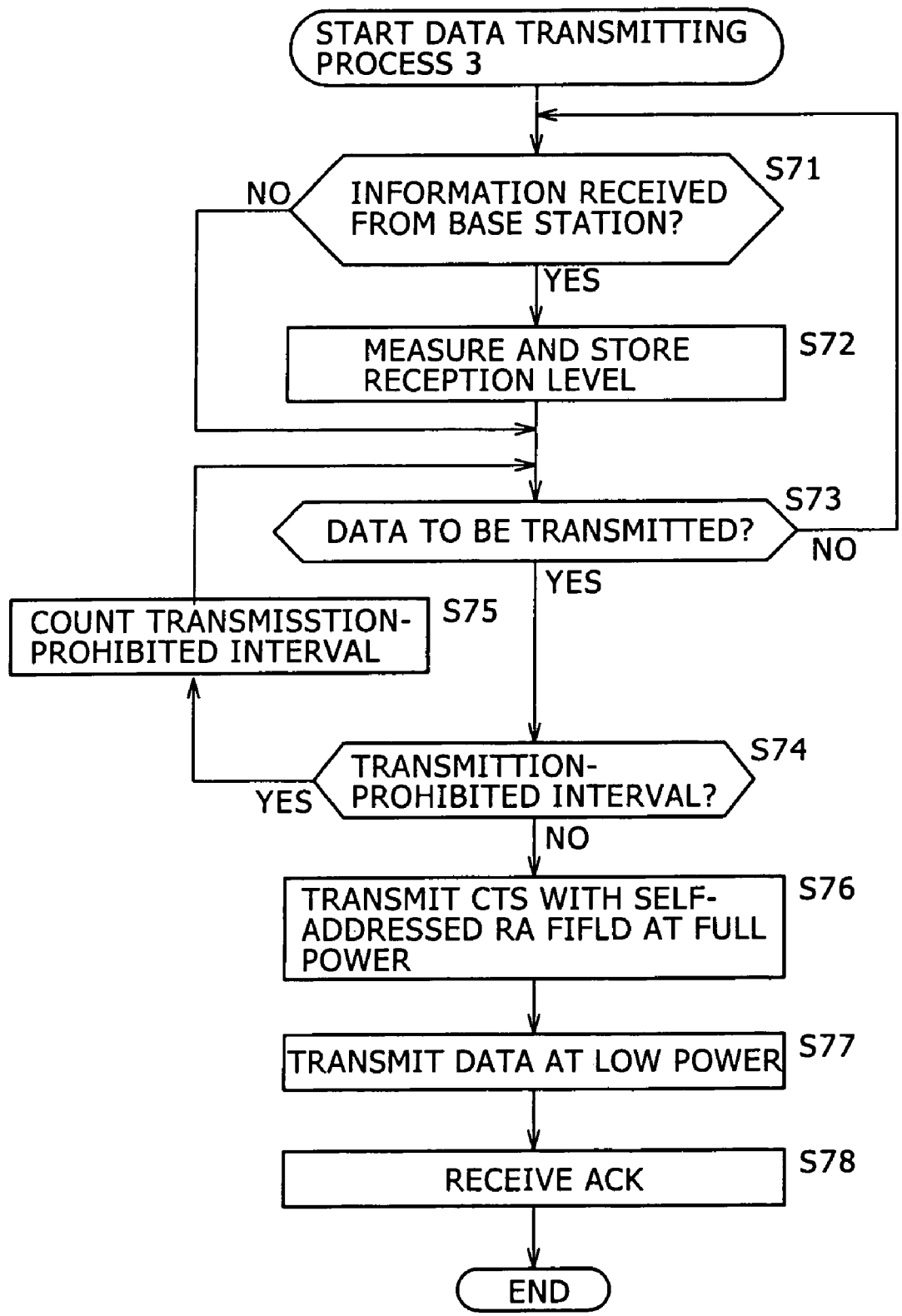
FIG. 14 is a flowchart of steps constituting a data transmitting process 3.

Described below with reference to the flowchart of FIG. 14 is the data transmitting process 3 to be carried out by the terminal 31 or 32 capable of transmitting a CTS frame.

In step S71, the reception unit 68 checks to determine whether or not data or communication control information such as a beacon transmitted at intervals of 100 msec by the base station 3 is received. The check is made illustratively by verifying whether or not any signal has been supplied through the antenna switch 66.

If in step S71 any data or communication control information is found received from the base station 3, step S72 is reached. In step S72, the reception unit 68 measures a reception level of the receiving signal supplied through the antenna switch 66, and supplies the measured reception level to the MAC control unit 62 or 111. In turn, the memory 83 in the MAC control unit 62 or 111 retains the supplied reception level.

If in step S71 data or communication control information is not found received from the base station 3, or when step S72 has been finished, step S73 is reached. In step S73, the CPU 81 in the MAC control unit 62 or the CPU 121 in the MAC control unit 111 checks to determine whether or not to transmit data to the base station 3. This check is made on the basis of the signal supplied from the PDA 52 through the host interface unit 61. If it is determined in step S73 that no data is to be transmitted, then control is returned to step S71 and the subsequent steps are repeated.

If it is determined in step S73 that data is to be transmitted, step S74 is reached. In step S74, the CPU 81 in the MAC control unit 62 or the CPU 121 in the MAC control unit 111 references the duration field in the CTS frame received earlier, to determine if a transmission-prohibited interval is in effect.

If it is determined in step S74 that the transmission-prohibited interval is in effect, the CPU 81 in the MAC control unit 62 or the CPU 121 in the MAC control unit 111 goes to step S75 and starts counting the interval. After the transmission-prohibited interval has been counted, control is returned to step S73 and the subsequent steps are repeated.

If it is determined in step S74 that a transmission-prohibited interval is not in effect, that means the terminal 31 or 32 is allowed to communicate (i.e., the base station 3 is deemed idle). In that case, step S76 is reached. In step S76, the CPU 81 in the MAC control unit 62 or the CPU 121 in the MAC control unit 111 causes the wireless frame composition/decomposition unit 82 to produce a CTS frame in which the address of this terminal is designated as the receiver address. The CTS frame thus produced is modulated through OFDM by the modulation unit 91 in the OFDM modem unit 63. The CPU 81 in the MAC control unit 62 controls the transmission unit 64 and the power amplifier 65, and the CPU 121 in the MAC control unit 111 controls the transmission unit 64, the high-power amplifier 112 and the power switch 114 in such a manner as to amplify the transmitting OFDM data to a full-power transmission level. The amplified CTS is transmitted to the base station 3 through the antenna switch 66 and antenna 67.

That is, the terminal 31 or 32 produces and transmits the same packet as that of the CTS explained above with reference to FIG. 10. The RA field of the CTS contains the address of the terminal 31 or 32 and its duration field carries the time required for the base station 3 to complete an ACK transmission.

Figure 15:
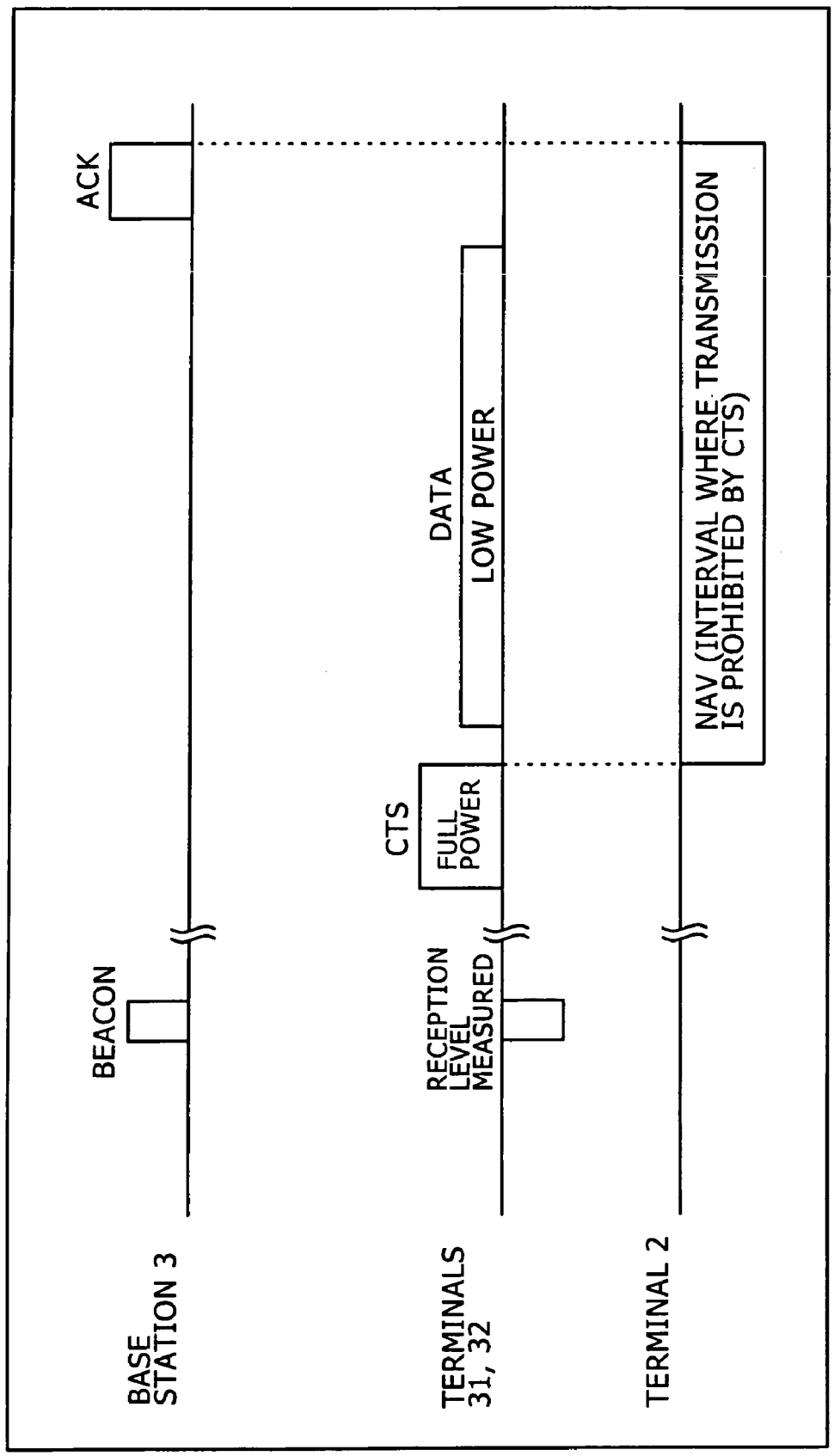
FIG. 15 is an explanatory view showing how an RTS and a CTS frame are used and how data is transmitted and received during the data transmitting process 1 in FIG. 14.

As shown in FIG. 15, if the terminal 31 or 32 transmits at full power the CTS frame in which the address of this terminal is designated as the receiver address, then the terminal 2 on receiving the CTS recognizes it as a CTS frame which has been transmitted by the base station 3 in response to the RTS transmitted by the terminal 31 or 32, and carries out processes accordingly. Specifically, the terminal 2 references the duration field included in the CTS frame, sets a transmission-prohibited interval (NAV) in accordance with the CTS, and does not transmit data to the base station 3 as long as the interval is in effect.

In step S77, the CPU 81 in the MAC control unit 62 or the CPU 121 in the MAC control unit 111 supplies the wireless frame composition/decomposition unit 82 with data supplied from the PDA 52 via the host interface 61 so that the supplied data will be turned into wireless frames. The wireless frames are modulated through OFDM by the modulation unit 91 in the OFDM modem unit 63. Since the memory 83 retains the reception level fed in step S72 following the measurement of the signal (e.g., beacon) received from the base station 3 prior to a CTS transmission, the CPU 81 in the MAC control unit 62 controls the transmission unit 64 and power amplifier 65 or the CPU 121 in the MAC control unit 111 controls the transmission unit 64, low-power amplifier 113 and power switch 114, based on the reception level held in the memory 83 in such a manner as to amplify the transmitting OFDM data to a low-power data transmission level. The amplified data in data packets is transmitted to the base station 3 via the antenna switch 66 and antenna 67.

In step S78, the reception unit 68 receives an ACK signal from the base station 3. This completes the process of FIG. 14.

Upon receipt of the CTS frame from the terminal 31 or 32, the terminal 2 sets a transmission-prohibited interval by carrying out a process that will be discussed later with reference to FIG. 16. With such an interval established, the terminal 2 will not transmit data to the base station 3 as long as data packets are being transmitted at low power from the terminal 31 or 32. That is, the process makes it possible to boost throughput by letting the terminal 31 or 32 transmit data packets at low power without getting disrupted by any other terminal attempting to transmit data.

Figure 16:
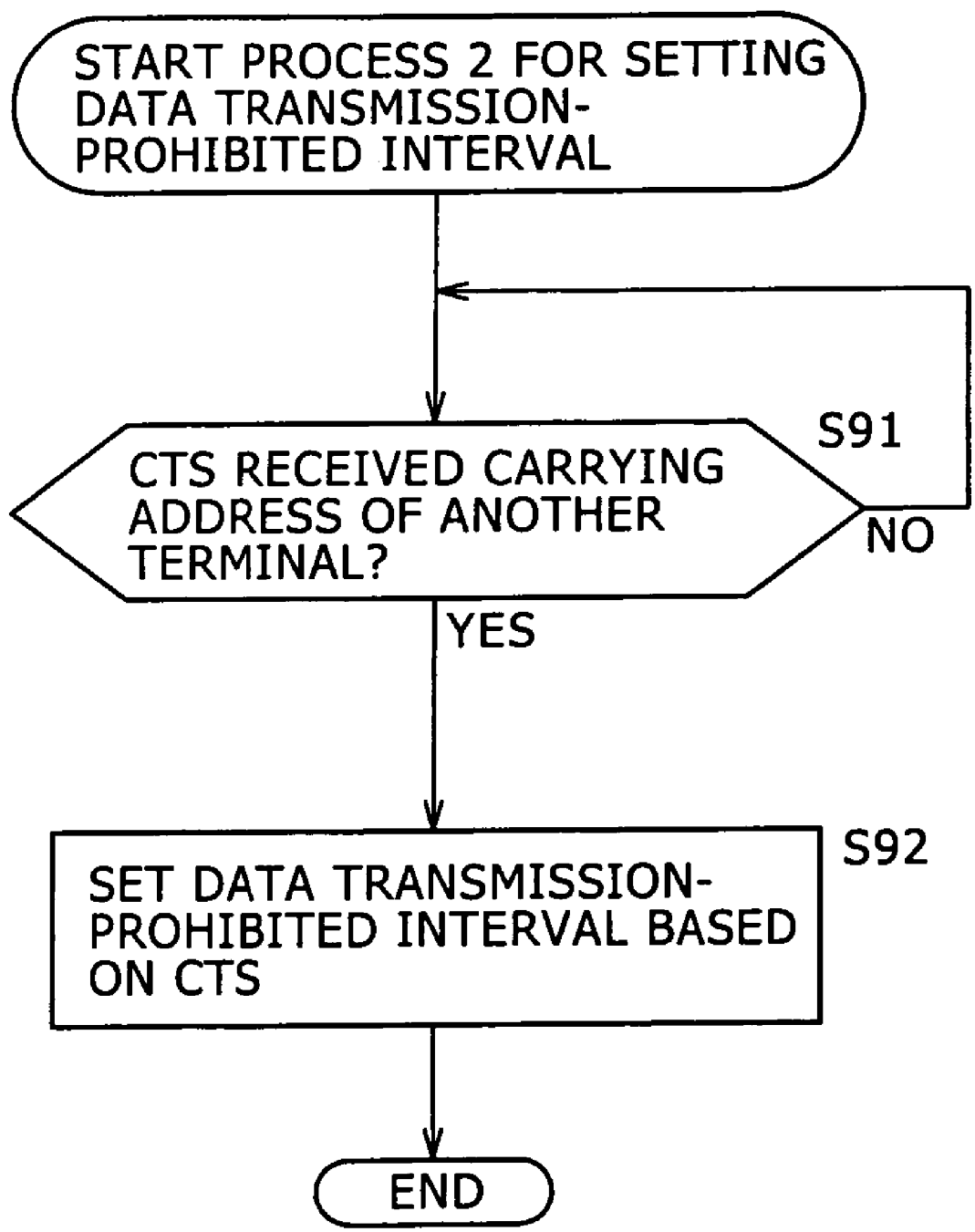
FIG. 16 is a flowchart of steps constituting a process 2 for setting a data transmission-prohibited interval.

Described below with reference to the flowchart of FIG. 16 is the process 2 for setting a transmission-prohibited interval, to be carried out by the terminal 2 in parallel with the process discussed above by referring to FIG. 14. It is assumed here that the terminal 2 is basically the same in structure as the terminal 31 explained above in reference to FIG. 5.

In step S91, the CPU 81 in the MAC control unit 62 of the terminal 2 checks to determine whether or not a CTS frame with its RA field containing the address of another terminal (e.g., terminal 31 or 32) is received on the basis of the signal supplied from the wireless frame composition/decomposition unit 82. If in step S91 any CTS frame containing the address of another terminal is not found received, then step S91 is repeated until such a CTS frame carrying the address of another terminal is found to have received.

If in steps S91 the CTS frame carrying the address of another terminal is found received, step S92 is reached. In step S92, the CPU 81 in the MAC control unit 62 of the terminal 2 references the duration field of the received CTS frame, sets a data transmission-prohibited interval (NAV) accordingly, and brings the process of FIG. 16 to an end.

The CTS frame received by the terminal 2 in the process of FIG. 16 is the CTS transmitted from the terminal 31 or 32 in step S76 of FIG. 14. This process, performed by the terminal 2, is the same as the process carried out in steps S23 and S24 above of FIG. 12 when the CTS frame transmitted from the base station 3 was received.

As described, if the terminal 2, another terminal within the same service area 11, is capable of transmitting data and setting a transmission-prohibited interval through the transmission and reception of CTS and RTS frames, then the terminal 31 or 32 according to this invention can transmit data packets in low power mode by carrying out the process of FIG. 14 so as to boost throughput while averting interference with data transmission ahead of time.

In the process discussed above in reference to FIG. 14, CTS frames were shown transmitted and received prior to data packet transmission. Alternatively, where the length of the data to be transmitted is short, a further boost in throughput is obtained by not carrying out the process of data transmission at low power based on the transmission and reception of CTS frames.

Figure 17:
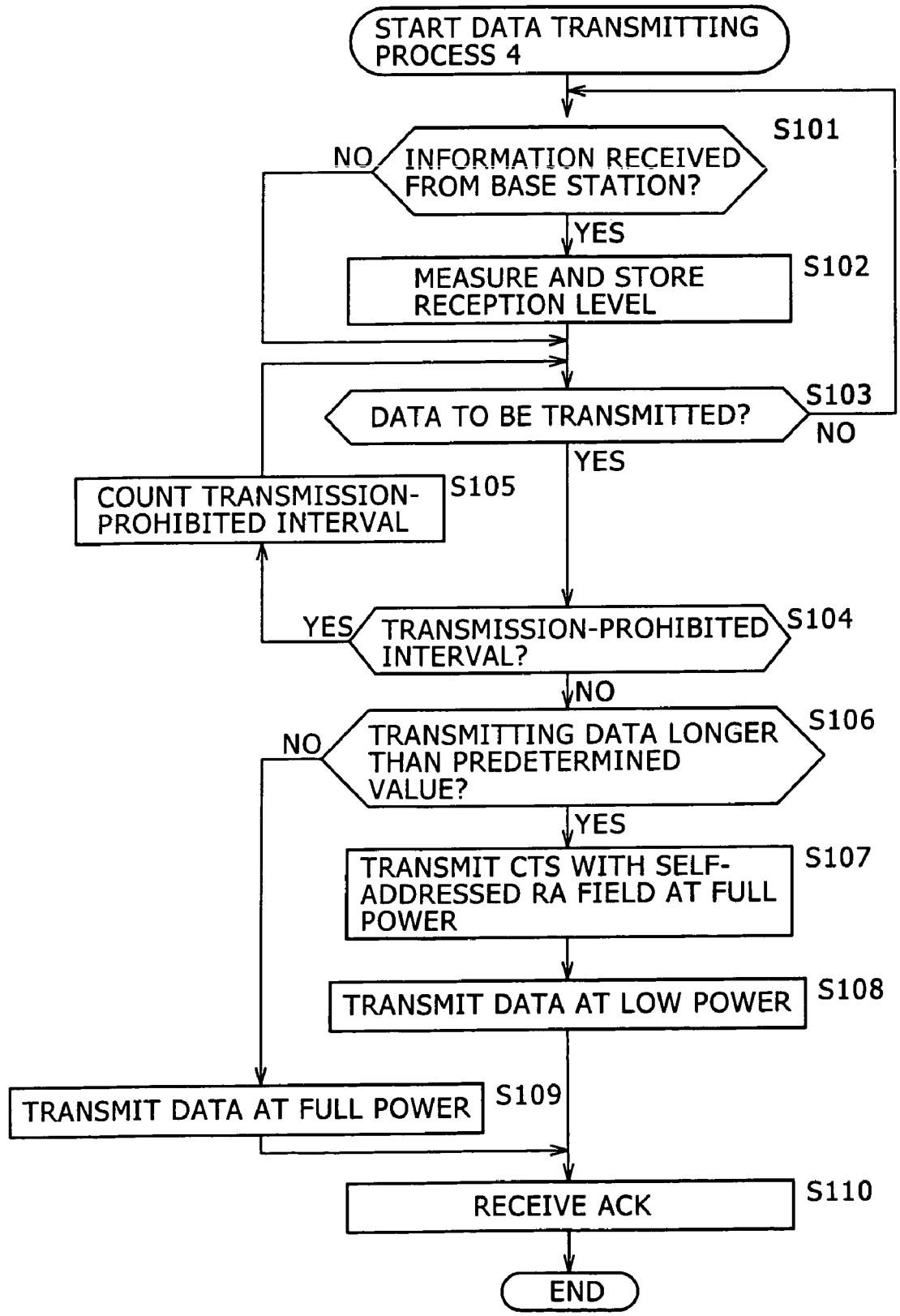
FIG. 17 is a flowchart of steps constituting a data transmitting process 4.

Described below with reference to the flowchart of FIG. 17 is the data transmitting process 4 which makes it possible to determine whether or not to transmit data at low power based on the length of the data to be transmitted.

Steps S101 through S105 are carried out in the same manner as steps S71 through S75 discussed above by referring to FIG. 14.

Illustratively, a check is made to determine whether or not any information transmitted by the base station 3 such as a beacon is received. If such information is found received, the reception level of the received information is measured and stored.

Another check is made to determine whether or not to transmit data to the base station 3. If it is determined that data is to be transmitted, then yet another check is made to determine whether or not a transmission-prohibited interval is in effect, by referencing the duration field of the CTS frame received earlier. If the transmission-prohibited interval is found to be in effect, the interval is counted. When the interval has been counted, control is returned to step S103 and the subsequent steps are repeated.

If in step S104 a transmission-prohibited interval is not found to be in effect, then step S106 is reached. In step S106, the CPU 81 in the MAC control unit 62 or the CPU 121 in the MAC control unit 111 checks to determine whether or not the length of the data to be transmitted is greater than a predetermined value based on the data supplied through the host interface unit 61. The predetermined value is a value that may be set to reflect a well-balanced trade-off between the reduction in power consumption by the terminal 31 or 32 and the boost in throughput.

If in step S106 the data length of the transmitting data is found greater than the predetermined value, then steps S107 and S108 are reached and carried out in the same manner as steps S76 and S77 of FIG. 14. More specifically, a CTS frame in which the address of this terminal is designated as the receiver address is produced and modulated through OFDM. The CTS frame thus modulated is amplified to a full-power transmission level before being transmitted to the base station 3.

That is, the terminal 31 or 32 generates and transmits the same packet as that of the CTS frame discussed above with reference to FIG. 10. The RA field of the CTS frame contains the address of the terminal 31 or 32, and the duration field of the CTS carries the time required for the base station 3 to complete an ACK transmission. Thus the terminal 2 upon receipt of the CTS frame recognizes that this CTS has been transmitted by the base station 3, and references the duration field included in the CTS to set a transmission-prohibited interval (NAV) accordingly. As long as the interval thus established is in effect, the terminal 31 or 32 does not transmit data to the base station 3.

The data supplied from the PDA 52 is structured into wireless frames which are then modulated through OFDM. The modulated data is amplified to a low-power data transmission level based on the reception level which was stored earlier in step S102 after being measured from the signal (e.g., beacon) received from the base station 3 prior to CTS frame transmission. The amplified data is transmitted in data packets to the base station 3.

If in step S106 the length of the transmitting data is not found greater than the predetermined value, then step S109 is reached. In step S109, the CPU 81 in the MAC control unit 62 or the CPU 121 in the MAC control unit 111 supplies the wireless frame composition/decomposition unit 82 with the data coming from the PDA 52 so that the supplied data will be composed into wireless frames. The data in wireless frames is then modulated through OFDM by the modulation unit 91 in the OFDM modem unit 63. Then the CPU 81 in the MAC control unit 62 controls the transmission unit 64 and power amplifier 65 or the CPU 121 in the MAC control unit 111 controls the transmission unit 64, high-power amplifier 112 and power switch 114, in such a manner as to amplify the transmitting OFDM data to a full-power data transmission level. The amplified data is transmitted in data packets to the base station 3 via the antenna switch 66 and antenna 67.

Upon completion of step S108 or S109, step S110 is reached. In step S110, the reception unit 68 receives an ACK signal from the base station 3. This completes the process of FIG. 17.

As described, where the length of the data to be transmitted is short, performing the process of FIG. 17 makes it possible to keep off the data transmission at low power based on CTS frames being transmitted and received. Executing the process of FIG. 17 thus provides higher throughput than resorting to the process of FIG. 14 if the data length of the outgoing data is limited.

The apparatus and method embodying this invention, as described above, comply with the IEEE 802.11 standard on media access control (MAC) in reducing power consumption of the inventive terminal during wireless communication with no disruption by another terminal attempting to transmit data.

Illustratively, in a wireless LAN environment such as a hot spot where an indefinite number of terminals coexist, any one of the configured terminals may reduce its power consumption when transmitting data in low power mode, i.e., at a data transmission power level relevant to the distance to the opposite party of wireless communication (e.g., base station 3) free of disruption by another terminal (e.g., terminal 2) transmitting data to the same party.

In particular, this invention is applied advantageously to small information processing apparatuses such as PDAs or to devices (e.g., card 51 or 101) which are attached to these small devices and which execute wireless communication processes in combination therewith. Carrying out the invention in this manner helps prolong the service life of the batteries used by the apparatus or reduces the battery size.

If the terminal 31 or 32 is incapable of transmitting data in low power mode, the terminal is still allowed to transmit a CTS frame with its RA field containing the address of this terminal, as described with reference to FIGS. 14 through 17. In that case, the absence of the need to transmit an RTS frame helps improve throughput unlike in the conventional process requiring the use of RTS and CTS frames.

In the foregoing description, the terminal 31 or 32 was shown transmitting data to the base station 3 as well as to the server 5 via the Internet 4. However, this is not limitative of the invention. Obviously the invention applies just as advantageously to cases where the terminal 31 or 32 transmits data to another terminal.

The series of steps and processes described above may be executed either by hardware or by software. For the software-based processing to take place, the programs constituting the software may be either incorporated beforehand in dedicated hardware of a computer or installed upon use from a suitable recording medium into a general-purpose personal computer or like equipment capable of executing diverse functions based on the installed programs.

As shown in FIG. 5 or 6, the recording medium carrying the programs to be installed into the computer for execution may be a package medium constituted by the magnetic disk (including flexible disks) 71, optical disk (including CD-ROM (Compact Disc-Read Only Memory) and DVD (Digital Versatile Disc)) 72, magneto-optical disk (including MD (Mini-Disc), registered trademark) 73, or semiconductor memory 74.

In this description, the steps which are stored on the recording medium and which describe the programs to be executed represent not only the processes that are to be carried out in the depicted sequence (i.e., on a time series basis) but also processes that may be performed parallelly or individually and not chronologically.

In this description, the term "system" refers to an entire configuration made up of a plurality of component devices.

INDUSTRIAL APPLICABILITY

The present invention is designed to carry out wireless communication. In particular, it is possible to transmit communication-related information such as RTS at a high-power transmission level while controlling the power for data transmission based on the reception level of the information transmitted from the destination of the data transmission, whereby wireless communication is performed in low power mode.

Another example of the present invention is arranged not only to conduct communications but also to transmit information such as CTS which is usually transmitted by administrative system followed by the transmission of other values and data, whereby throughput is enhanced.

The invention claimed is:

1. An information processing apparatus for communicating wirelessly with an administrative system and for transmitting data to another information processing apparatus via said administrative system, said information processing apparatus comprising:

communicating means for transmitting data to said administrative system and for transmitting or receiving information for controlling the wireless communication with said administrative system;

measuring means for measuring a reception level of said information or said data being received by said communicating means; and controlling means for controlling transmission power in a manner allowing said communicating means to transmit said information or said data;

wherein said controlling means compares a data length of the data with a threshold value, if the data length is not greater than the threshold value, said controlling means controls said transmission power such that the data is transmitted at a maximum controllable transmission power level or at a first transmission power level close to the maximum controllable transmission power level, and if the data length is greater than the threshold value, said controlling means controls said transmission power such that a first item of said information signaling a start of transmission of said data is transmitted at the maximum controllable transmission power level or at the first transmission power level, and if a second item of said information is transmitted by said administrative system based on the first information item to enable the start of transmission of said data and is received by said communicating means, said measuring means measures a reception level of the second information item and said controlling means controls the power for transmitting said data based on said reception level measured by said measuring means.

2. The information processing apparatus according to claim 1, further comprising a plurality of amplifying means for amplifying a signal level for transmitting said first information item or said data; wherein said plurality of amplifying means amplify said signal level at different amplification factors, and said controlling means controls said power for transmitting said first information item or said data by selecting any one of said plurality of amplifying means.

3. The information processing apparatus according to claim 1, wherein the communication with said administrative system is carried out according to IEEE 802.11 standards, and said first information item is an RTS frame and said second information item is a CTS frame.

4. An information processing method for use with an information processing apparatus for communicating wirelessly with an administrative system and for transmitting data to another information processing apparatus via said administrative system, said method comprising:
comparing a data length of the data with a threshold value;
if the data length is not greater than the threshold value, controlling transmission power such that the data is transmitted at a maximum controllable transmission power level or at a first transmission power level close to the maximum controllable transmission power level; and
if the data length is greater than the threshold value,
firstly controlling transmission power such that first information signaling a start of transmission of said data is transmitted at the maximum controllable transmission power level or at the first transmission power level,
controlling reception of second information transmitted by said administrative system based on said first information, said second information enabling the start of transmission of said data,
measuring a reception level of said second information, and
secondly controlling transmission power such that said data is transmitted at a transmission power level based on said reception level of said second information measured in said measuring step.

5. A computer-readable medium which stores a program having instructions for carrying out a method of allowing an information processing apparatus to communicate wirelessly with an administrative system and to transmit data to another information processing apparatus via said administrative system, said method comprising:
comparing a data length of the data with a threshold value;
if the data length is not greater than the threshold value, controlling transmission power such that the data is transmitted at a maximum controllable transmission power level or at a first transmission power level close to the maximum controllable transmission power level; and
if the data length is greater than the threshold value,
firstly controlling transmission power such that first information signaling a start of transmission of said data is transmitted at the maximum controllable transmission power level or at the first transmission power level,
controlling reception of second information transmitted by said administrative system based on said first information, said second information enabling the start of transmission of said data,
measuring a reception level of said second information, and
secondly controlling transmission power such that said data is transmitted at a transmission power level based on said reception level of said second information measured in said measuring step.

6. A processor encoded with a computer program for carrying out a method of allowing an information processing apparatus to communicate wirelessly with an administrative system and to transmit data to another information processing apparatus via said administrative system, said method comprising:
comparing a data length of the data with a threshold value;
if the data length is not greater than the threshold value, controlling transmission power such that the data is transmitted at a maximum controllable transmission power level or at a first transmission power level close to the maximum controllable transmission power level; and
if the data length is greater than the threshold value,
firstly controlling transmission power such that first information signaling a start of transmission of said data is transmitted at the maximum controllable transmission power level or at the first transmission power level,
controlling reception of second information transmitted by said administrative system based on said first information, said second information enabling the start of transmission of said data,
measuring a reception level of said second information, and
secondly controlling transmission power such that said data is transmitted at a transmission power level based on said reception level of said second information measured in said measuring step.

7. An information processing apparatus for transmitting data to another information processing apparatus via administrative system which, upon receipt of first information requesting permission of a start of data transmission, transmits second information enabling the start of the data transmission, said information processing apparatus comprising:
communicating means which receives information from said administrative system and which first designates an address of said information processing apparatus as a receiving address in said second information and controls transmission of said second information, and then controls transmission of said data to said another information processing apparatus via said administrative system.

8. The information processing apparatus according to claim 7, further comprising:
measuring means for measuring a reception level of said information received by said communicating means from said administrative system or of said data transmitted by said administrative system to said another information processing apparatus; and
controlling means for controlling transmission power in a manner allowing said communicating means to transmit said second information and said data;
wherein said communicating means communicates wirelessly with said administrative system, and said controlling means controls transmission power in such a manner that said second information is transmitted at a maximum controllable transmission power level or at a first transmission power level close to said maximum controllable transmission power level, and that said data is transmitted thereafter at a transmission power level based on said reception level measured by said measuring means.

9. The information processing apparatus according to claim 8, further comprising a plurality of amplifying means for amplifying a signal level for transmitting said second information or said data; wherein said plurality of amplifying means amplify said signal level at different amplification factors, and said controlling means controls the power for transmitting said second information or said data by selecting any one of said plurality of amplifying means.

10. The information processing apparatus according to claim 8, wherein said controlling means compares a data length of said data to be transmitted with a threshold value; if said data length is less than said threshold value, then said controlling means exercises control in such a manner that said data is transmitted at said first transmission power level, and if said data length is greater than said threshold value, then said controlling means exercises control in such a manner that said data is transmitted at a second transmission power level lower than said first transmission power level.

11. The information processing apparatus according to claim 7, wherein communication with said administrative system is carried out according to IEEE 802.11 standards, and wherein said first information is an RTS frame and said second information is a CTS frame.

12. An information processing method for use with an information processing apparatus for transmitting data to another information processing apparatus via administrative system which, upon receipt of first information requesting permission of a start of data transmission, transmits second information enabling the start of the data transmission, said method comprising:
firstly, said information processing apparatus designating an address of said information processing apparatus as a receiving address in said second information and controlling transmission of said second information; and
secondly, said information processing apparatus controlling transmission of said data to said another information processing apparatus via said administrative system.

13. A computer-readable medium which stores a program having instructions for carrying out a method of allowing an information processing apparatus to transmit data to another information processing apparatus via an administrative system which, upon receipt of first information requesting permission of a start of data transmission, transmits second information enabling the start of the data transmission, said method comprising:
firstly, said information processing apparatus designating an address of said information processing apparatus as a receiving address in said second information and controlling transmission of said second information; and
secondly, said information processing apparatus controlling transmission of said data to said another information processing apparatus via said administrative system.

14. A processor encoded with a computer program for carrying out a method of allowing an information processing apparatus to transmit data to another information processing apparatus via administrative system which, upon receipt of first information requesting permission of a start of data transmission, transmits second information enabling the start of the data transmission, said method comprising:
firstly, said information processing apparatus designating an address of said information processing apparatus as a receiving address in said second information and controlling transmission of said second information; and
secondly, said information processing apparatus controlling transmission of said data to said another information processing apparatus via said administrative system.

* * * * *